United States Patent [19]

Flint et al.

[11] 4,174,891

[45] Nov. 20, 1979

[54] MICROFILM READER/PRINTER

[75] Inventors: John R. Flint, Barrington; Bruce A. Rady, Glencoe, both of Ill.

[73] Assignee: Bell & Howell Company, Chicago, Ill.

[21] Appl. No.: 939,945

[22] Filed: Sep. 6, 1978

Related U.S. Application Data

[63] Continuation-in-part of Ser. No. 741,929, Nov. 15, 1976, abandoned.

[51] Int. Cl.[2] .................... G03B 23/12; G03B 23/08; G06K 7/00; G06K 19/00
[52] U.S. Cl. .................. 353/26 A; 235/463; 235/466; 235/494; 353/27 A; 364/200
[58] Field of Search .................... 318/7, 341; 364/200, 364/900; 353/26 R, 26 A, 27 R, 27 A; 235/487, 463, 466, 462, 494

[56] References Cited

U.S. PATENT DOCUMENTS

| 3,184,177 | 5/1965 | Hannah | 242/55.12 |
|---|---|---|---|
| 3,290,987 | 12/1966 | James et al. | 353/26 A |
| 3,671,722 | 6/1972 | Christie | 235/466 |
| 3,743,400 | 7/1973 | Haning et al. | 353/26 A |
| 3,751,152 | 8/1973 | Rirehart | 353/26 A |
| 3,809,335 | 5/1974 | Mantey | 318/7 |
| 3,809,468 | 5/1974 | Moritz | 353/26 A |
| 3,898,689 | 8/1975 | D'Orazio et al. | 235/463 |
| 3,926,513 | 12/1975 | Silver et al. | 353/26 R |
| 3,931,555 | 1/1976 | Dohanich et al. | 318/7 |
| 3,969,592 | 7/1976 | Pipitone et al. | 340/365 X |

Primary Examiner—Steven L. Stephan
Attorney, Agent, or Firm—Harry G. Thibault; Alan B. Samlan; John H. Moore

[57] ABSTRACT

A microprocessor controlled microfilm reader/printer is arranged to transport a roll of film having all images contained thereon, in a distinctive format involving sequentially recorded photographic areas. The reader/printer has an automatic call feature up, so that any given photographic area may be selected and projected responsive to the push of a button, the operation of a rotary switch, or both. A special bar code printed along an edge of the film eliminates the need for precise control over a film transport synchronized with a code reading speed. The bar code is preferably read by an optical electronic sensor, which provides a film positioning input control signal to enable an accurate locating of a selected photographic area within a viewing area.

62 Claims, 32 Drawing Figures

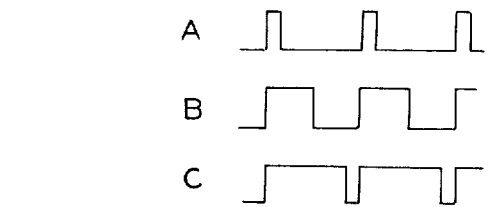
FIG.13
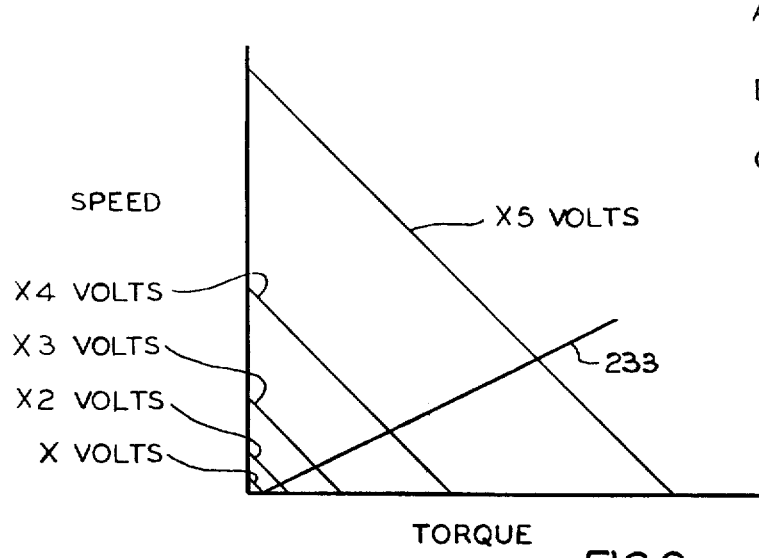
FIG.9
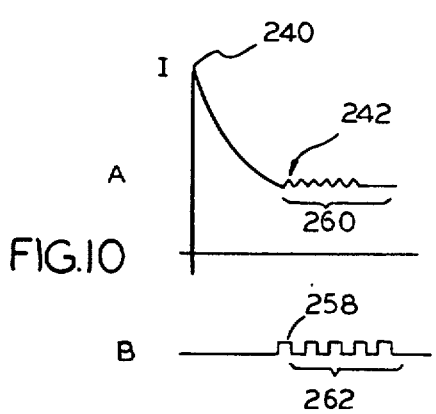
FIG.10
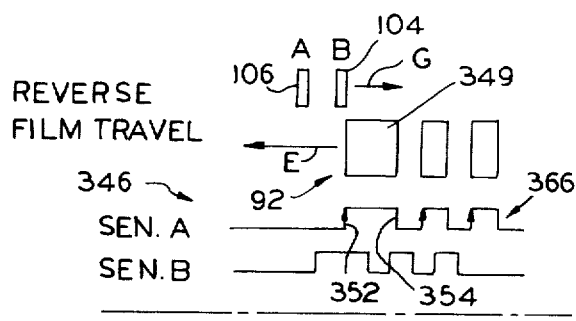
FIG.12
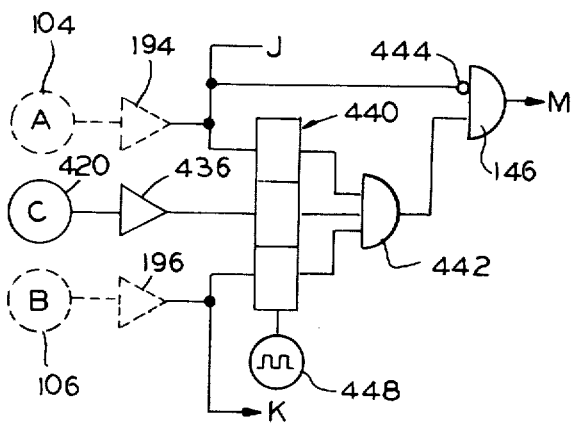
FIG.14
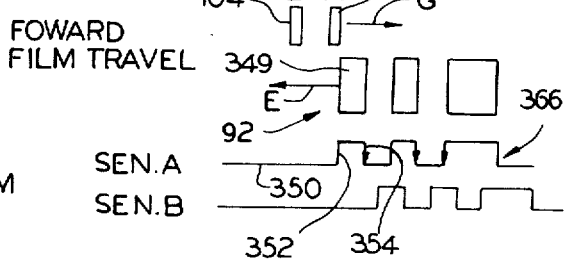
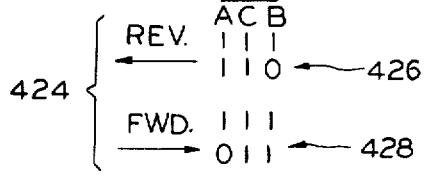
FIG.15

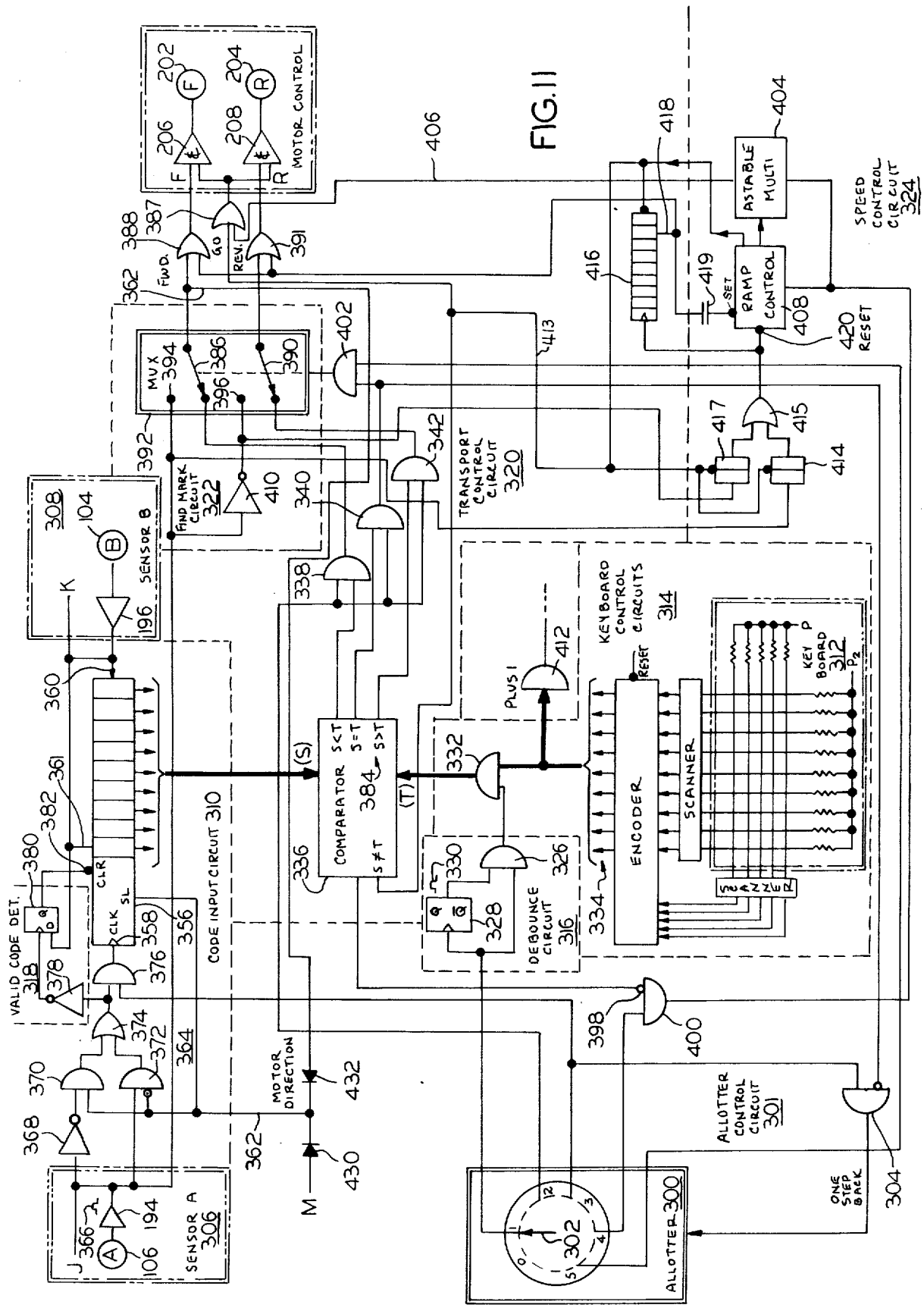

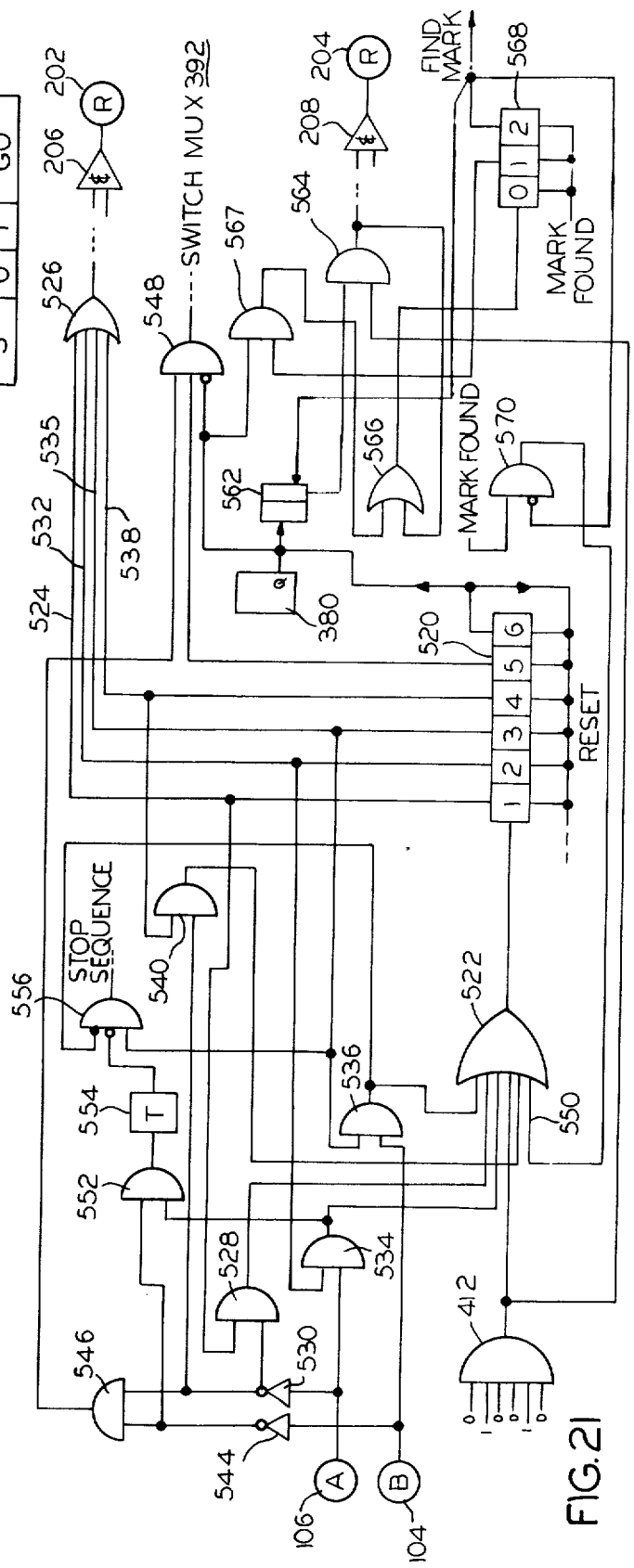

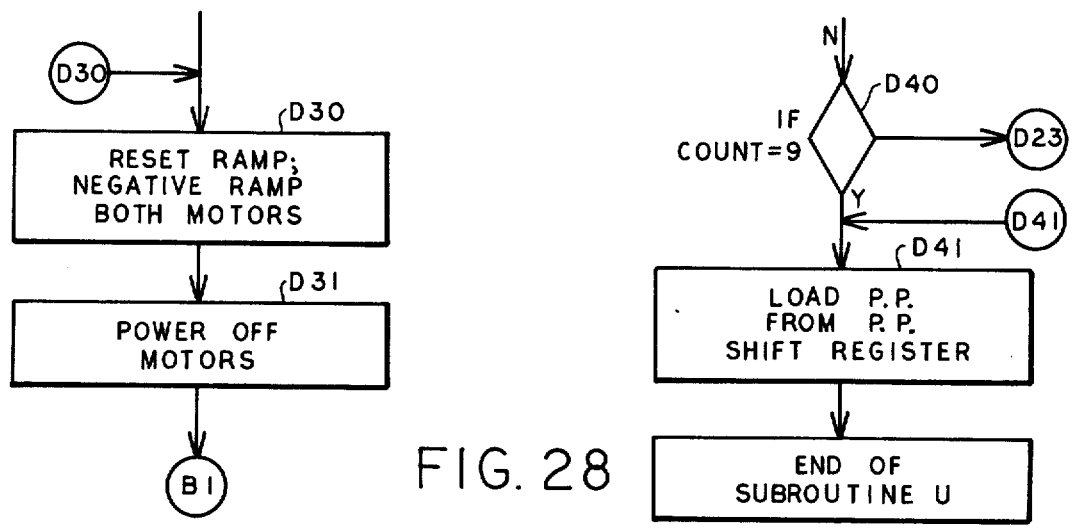
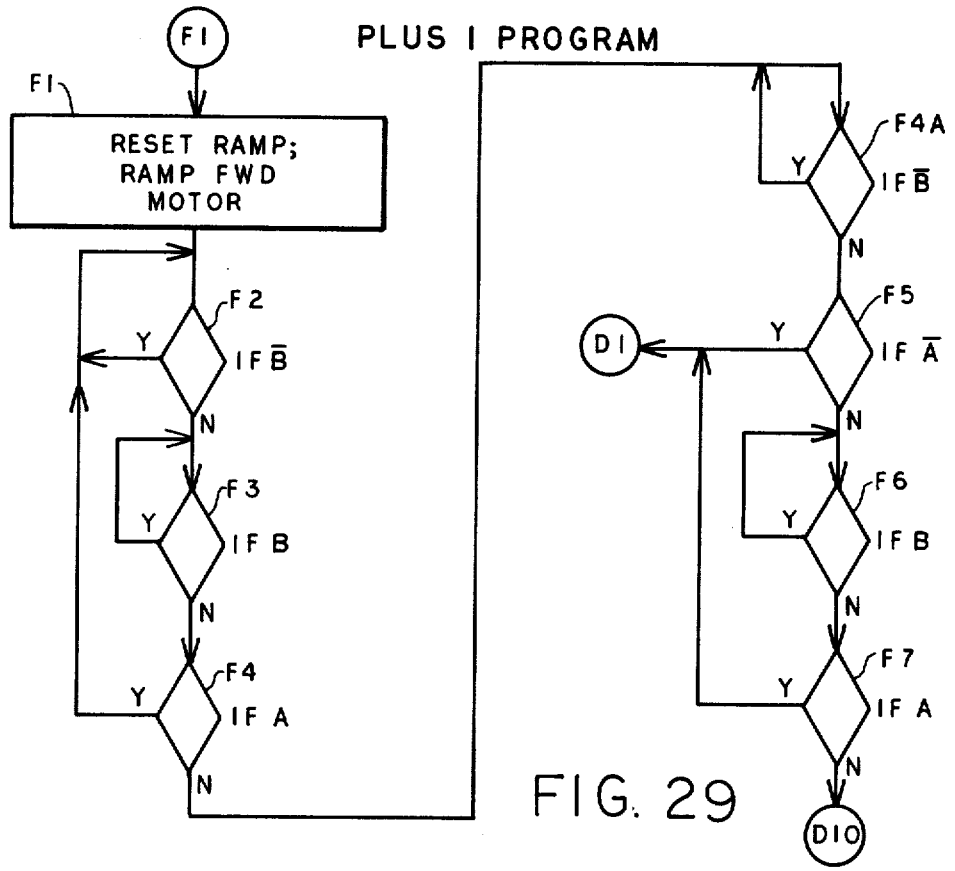
FIG. 28
FIG. 29
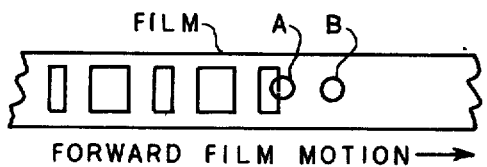
FIG. 30
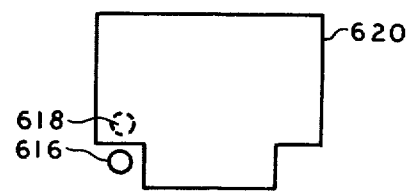
FIG. 31

MICROFILM READER/PRINTER

This application is a continuation-in-part of co-pending application Ser. No. 741,929, filed Nov. 15, 1976, now abandoned.

Reference is made to a copending application Ser. No. 711,180, now U.S. Pat. No. 4,110,020, entitled Microprocessor Controlled Roll Film Microfiche Reader, filed on Aug. 3, 1976 by Delmar Johnson, John R. Flint, Thomas Wells, Rolf Erikson and Bruce Rady, and assigned to the assignee of this invention.

This invention relates to microfilm readers, printers, and reader/printers and more particularly to means for transporting a roll of film through such devices, whether separate or combined. However, the invention also finds utility anytime that it is necessary or desirable to transport long webs or strips, such as film, magnetic tape, perforated tape, or the like. Therefore, the term "reader/printer" is to be construed broadly enough to cover all of these and equivalent devices, both combined and separated. Likewise, the terms "film, web, or strips" are to be construed broadly enough to cover any medium which may be transported in the inventive manner.

A microfiche is a well known photographic device wherein a plurality of images are micro-photocopies arranged in an orthogonal array, on a small card or sheet film. Therefore, the cards may become lost, damaged, destroyed, or refiled out of order. Sometimes, microfiche contain information which must be continuously updated as the recorded information becomes obsolete or is superseded. If a large file of microfiche must be updated on a continuous basis, a substantial amount of time and labor is required, and filing mistakes are often made. Moreover, there are costs in copying and manipulating the individual cards or sheets of film, which costs are not incurred when copying or manipulating rolls of film.

Yet another problem centers about security and control over a microfiche file. There are many times and conditions when a company, for example, wishes to issue a new edition of a microfiche "file" card, with an assurance that it will be properly filed and used by all employees, who are located at many widely scattered points. Also, the company would want to preclude unauthorized removal of individual microfiche from a company file. There may be confidential information on some of the microfiche and the company may not want to have it readily available for copying.

Still another consideration is existing customer habits. For example, a service or repairman conventionally has a number of very large books containing pictures of assemblies and long listings of parts for those assemblies. If these books are reproduced on microfiche, the arrangement of the microfiche should be such that the service or repairman may substantially follow his existing habit patterns, when using his books.

Accordingly an object of the invention is to provide new and improved microfilm reader/printers. Here an object is to provide reader/printers which do not require and, in fact prevent, the user from manually handling any individual photographic area. Here an object is to provide reader/printers wherein information is printed in distinctive photographic areas on a roll of microfilm. In this connection, an object is to enable the information to be printed in each area with the format of a microfiche.

Still another object of the invention is to provide microfilm reader/printers which are sturdy, foolproof, and yet of such low cost that they may be distributed to widely scattered points, even where the microfilm usage at any given point is relatively little.

Yet another object of the invention is to enable a ready call up and display of large catalogs on compact rolls of microfilm. Here, a specific object is to provide parts lists for service or repairmen or for centralized parts centers. Thus, an object is to provide microfilm reader/printers which function well, even in hostile (relative to photographic equipment) environments, such as a garage, for example.

In keeping with an aspect of the invention, these and other objects are accomplished by a microfilm reader/printer in which all images are orthogonally printed in photographic areas, in a microfiche format, on a roll of film. The reader/printer has an automatic call up feature so that any given photographic area may be selected and projected responsive to the push of a button or the operation of any other suitable switch. An electronic control circuit, such as a microprocessor automatically controls the movement of a film transport mechanism to position a selected photographic area in a viewing area. There, it is held stationary, while a lens is manually moved to project a selected image in the microfiche format.

A preferred embodiment of such a reader is shown on the attached drawings wherein.

Figure 1:
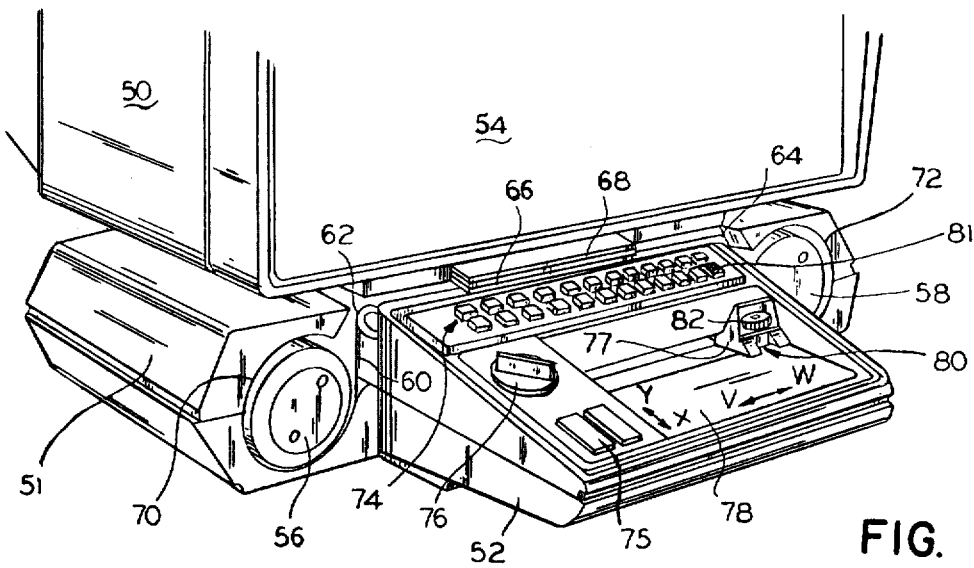
FIG. 1 is a perspective view of a roll film microfilm reader, printer, or reader/printer, incorporating the principles of the invention.
Figure 5:
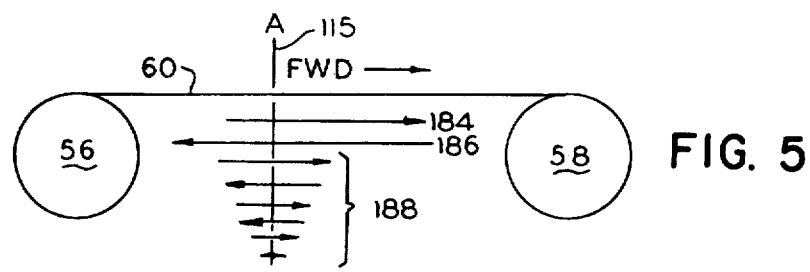
Figure 6:
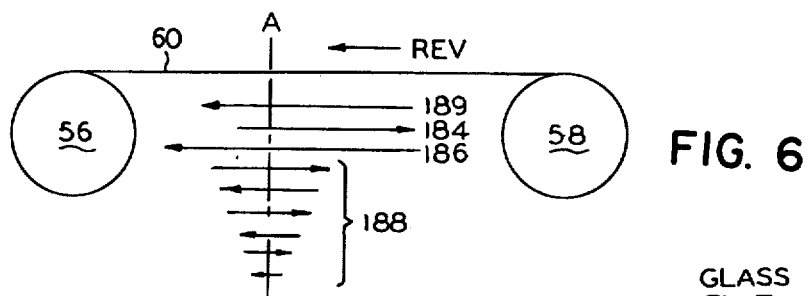
Figure 7:
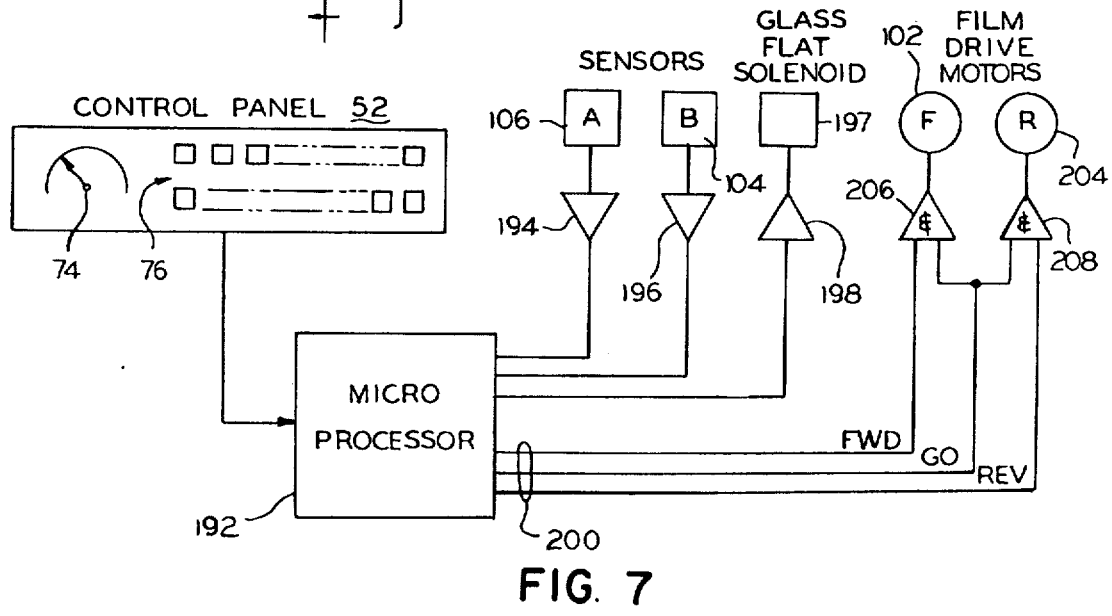
Figure 8:
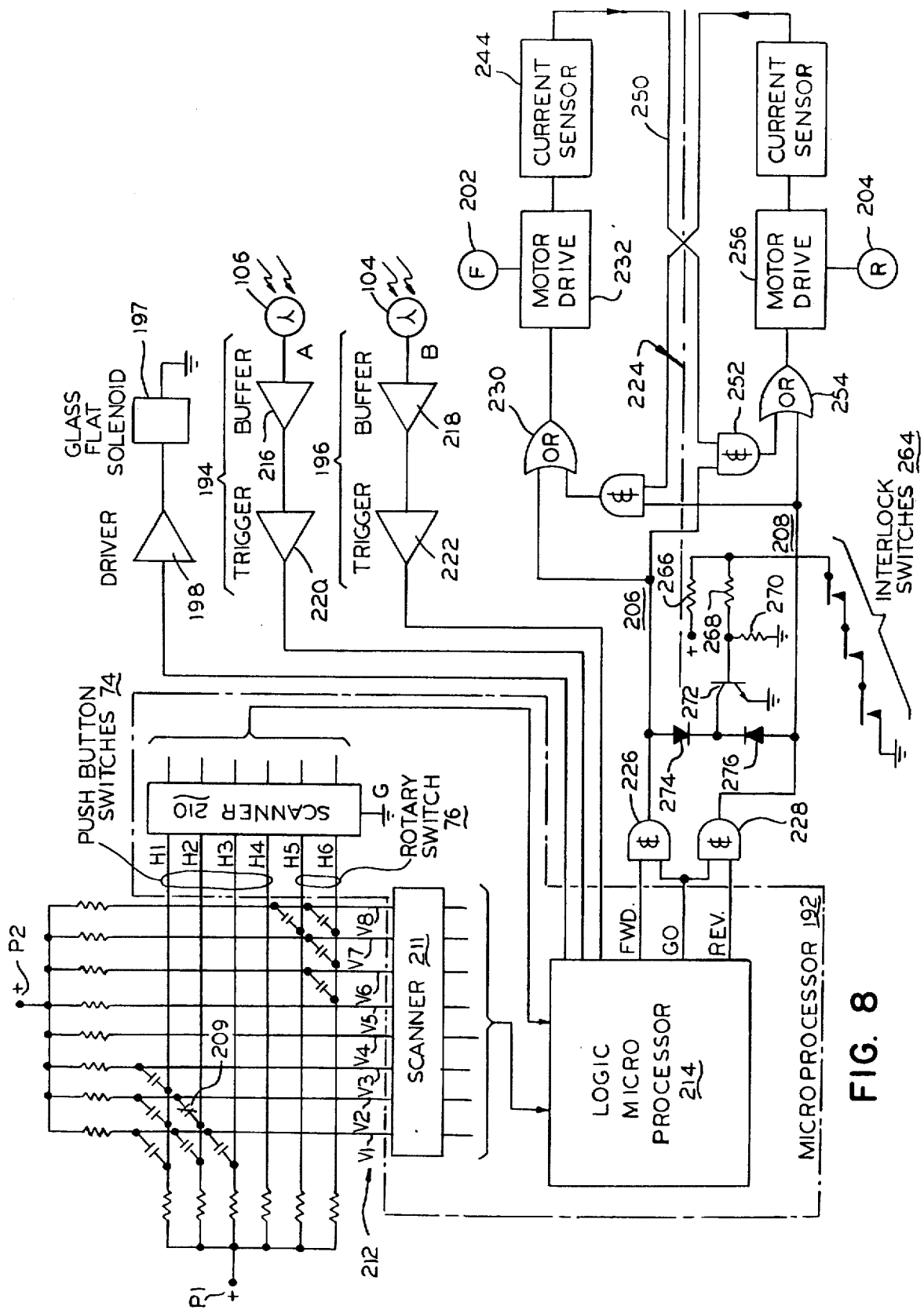

FIGS. 5 and 6 graphically represent the transport movement as the film is driven, reeled, and then brought to a stop;

FIG. 7 is a block diagram of an electronic system for controlling the microfilm reader/printer of FIG. 1;

FIG. 8 is a logic diagram of a control circuit used to complete the block diagram of FIG. 7;

FIG. 9 is a speed vs. torque graph which illustrates how the film is brought up to speed without loss of tension;

FIG. 10 is a graph which helps to illustrate how a tension is maintained in the film;

FIG. 11 is a block diagram of the logic portion of the control circuit;

FIG. 12 is a graphical representation of how the same information is stored regardless of the direction in which the film moves;

FIG. 13 graphically illustrates how current is increased to cause the film transport mechanism to initiate film movement;

FIG. 14 is a logic circuit which illustrates how three sensors may be arranged to detect the direction of film movement; and FIG. 15 graphically and schematically illustrates the three sensors of FIG. 14 and also shows a truth table explaining the operation thereof.

FIG. 16 illustrates the differences between regular bar codes and an overflow or "plus 1" bar code;

FIGS. 17-19 are three timing curves (similar to FIG. 4) for illustrating how the sensors read the three bar codes of FIG. 16;

FIG. 20 is a truth table for the three timing curves of FIGS. 17-19; and

FIG. 21 is a logic diagram of a "plus 1" control circuit.

Figure 22:
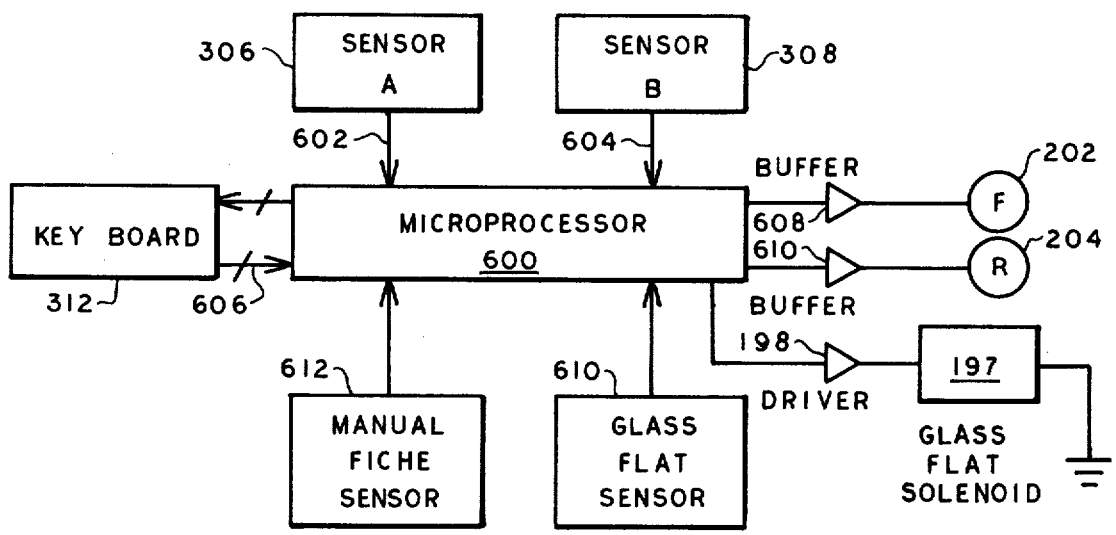
Figure 23:
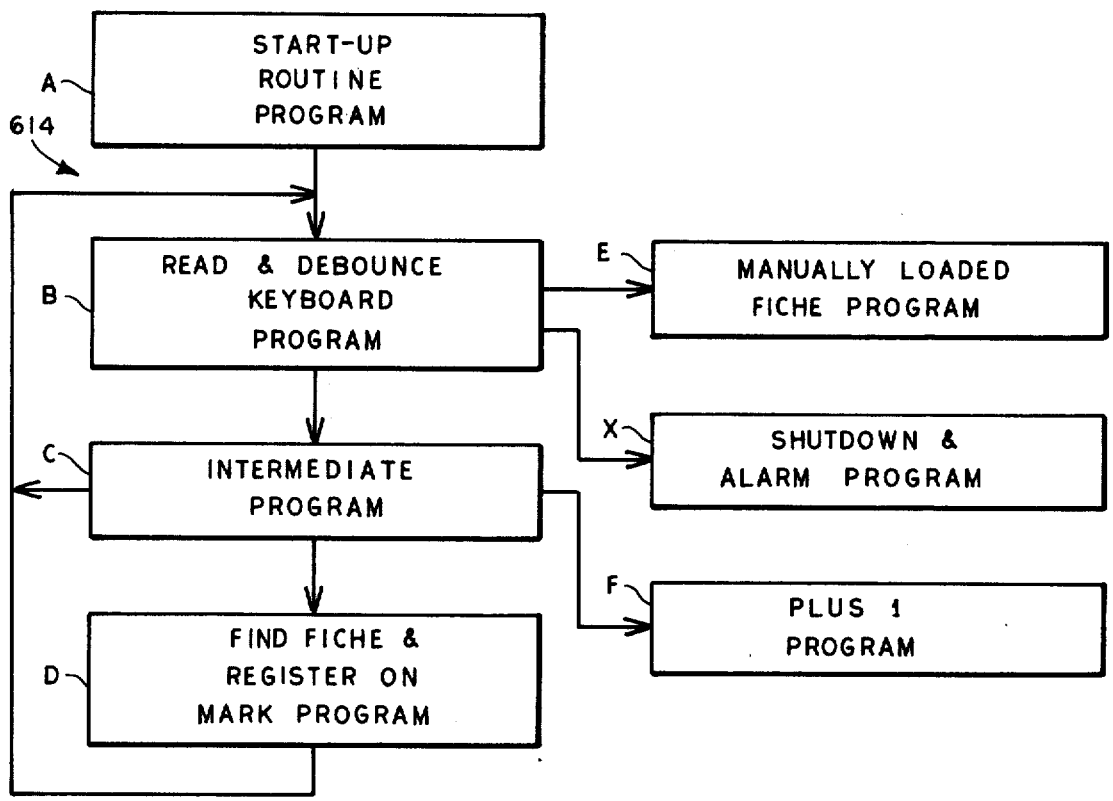
Figure 24:
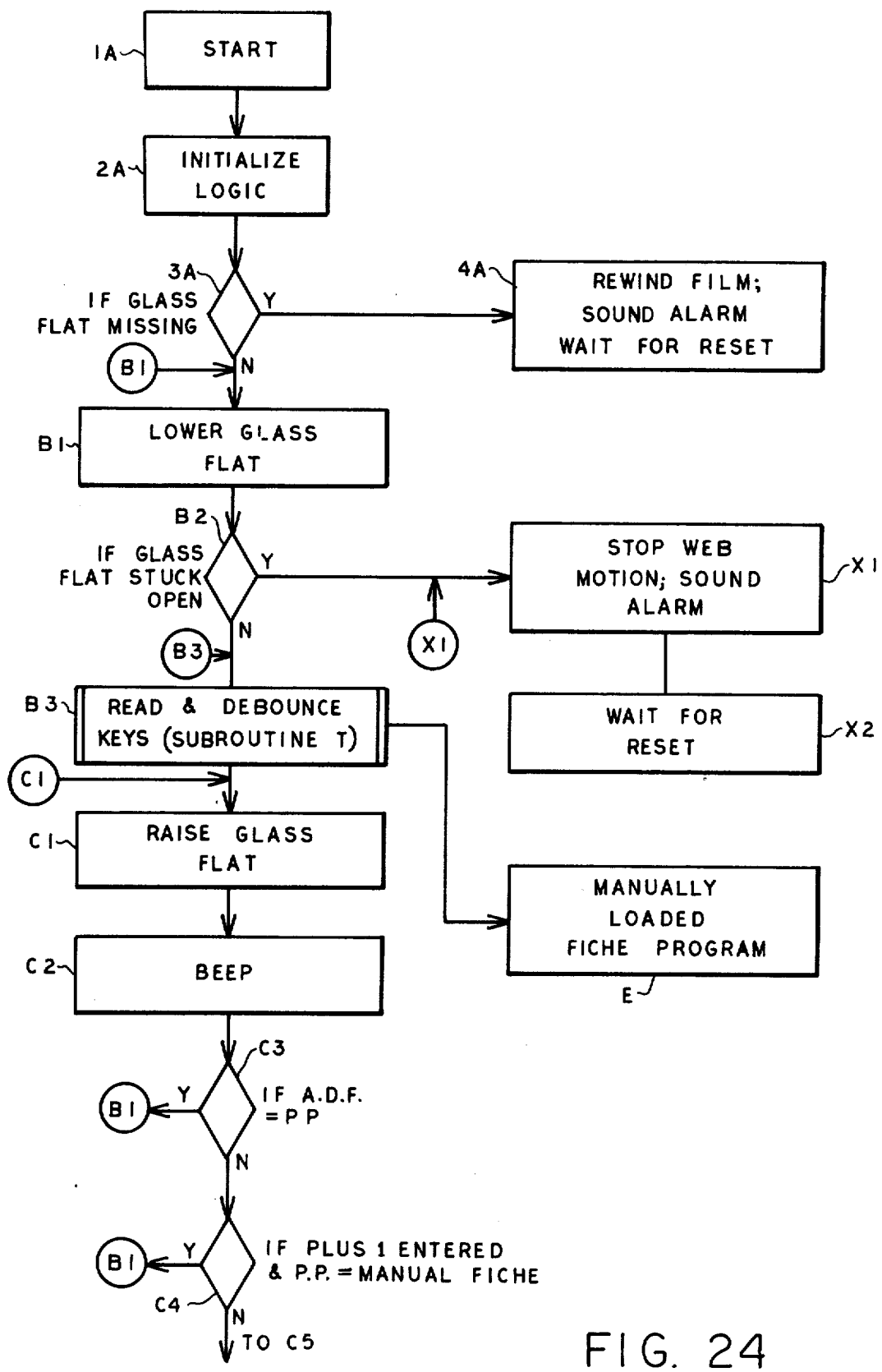
Figure 25:
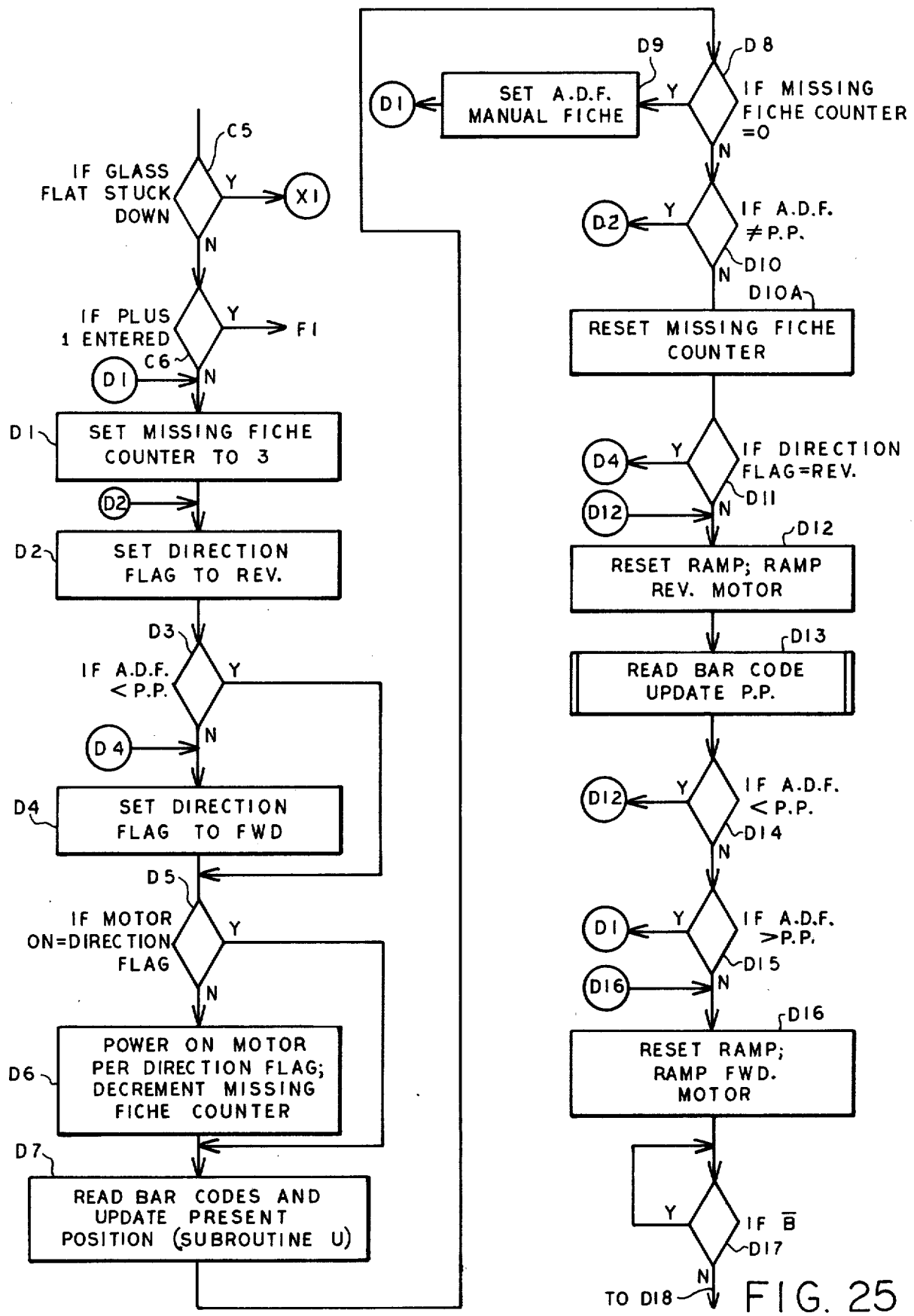
Figure 26:
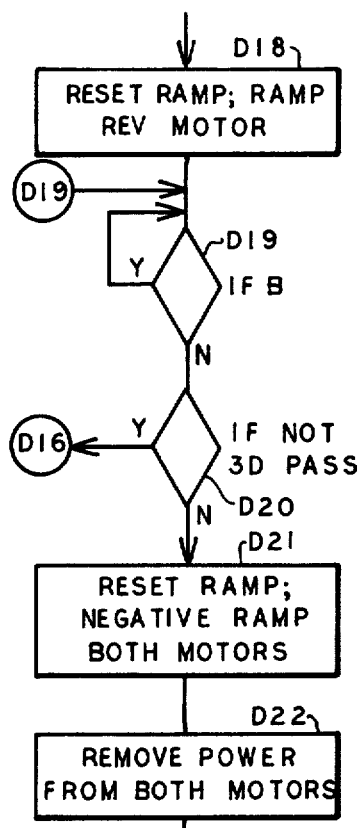
Figure 27:
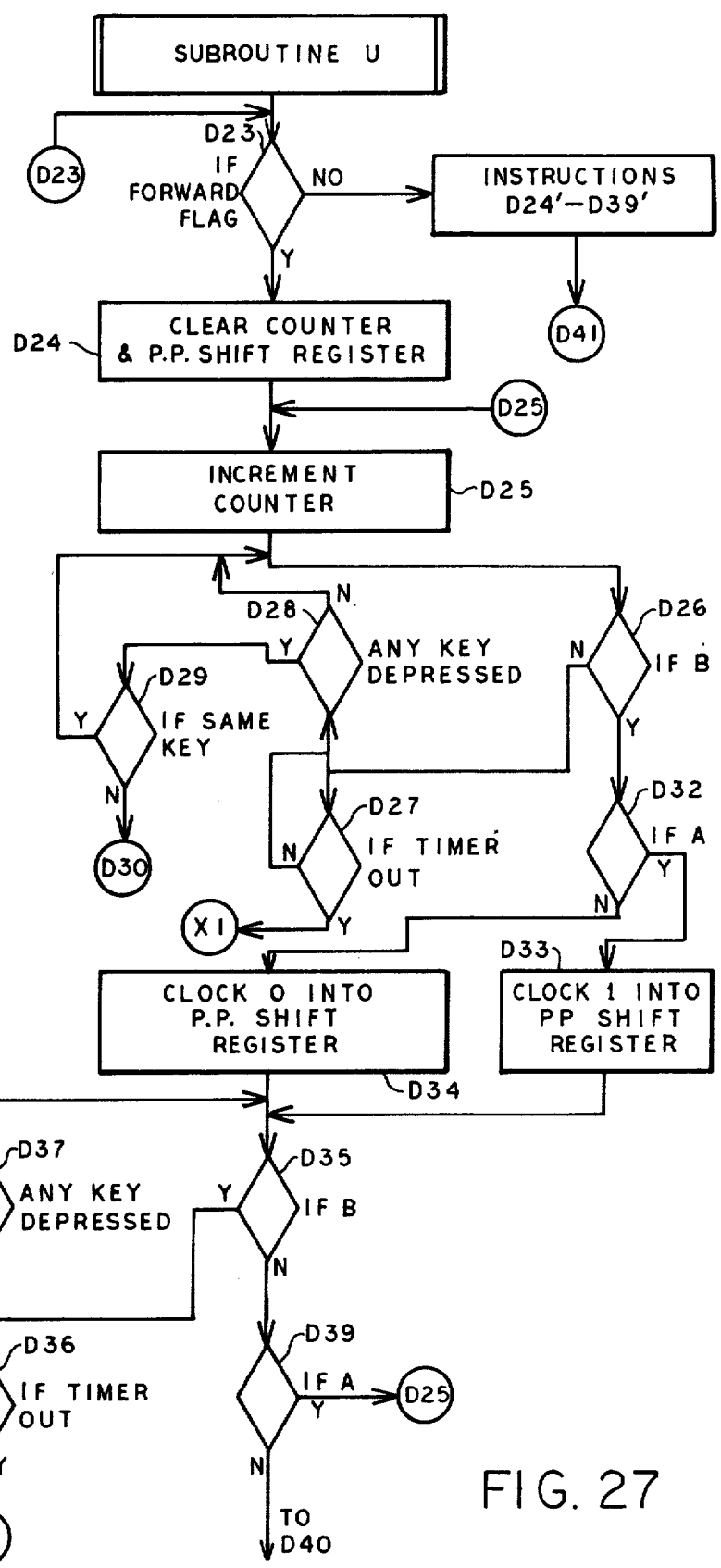
Figure 32:
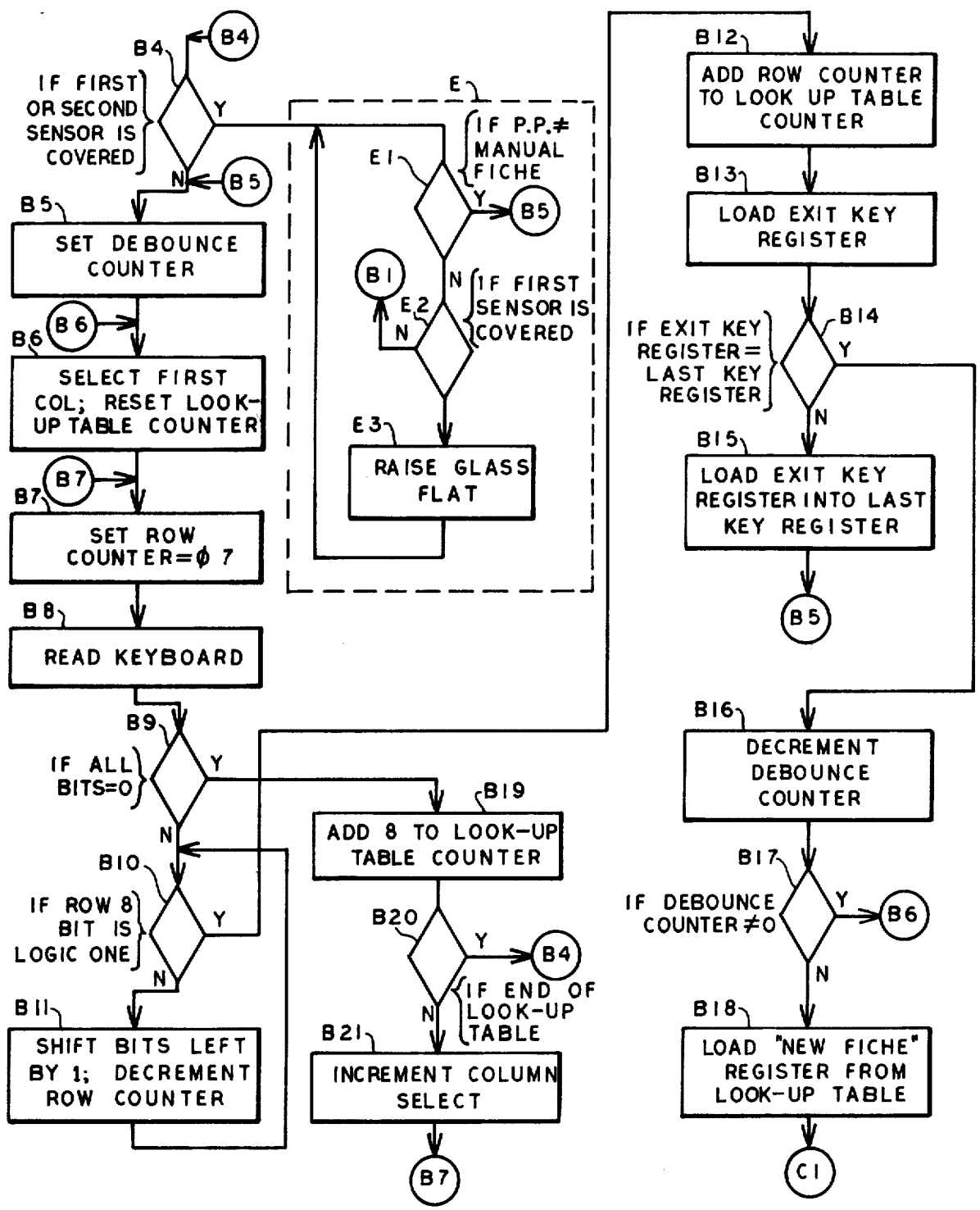

FIG. 22 is a block diagram of another embodiment of the invention wherein much of the circuitry illustrated in FIG. 11 is replaced by a microprocessor;

FIG. 23 is a general flow diagram depicting the various programs which control the microprocessor;

FIGS. 24-26 illustrate a more detailed flow diagram of the general flow diagram shown in FIG. 23;

FIGS. 27 and 28 illustrate a detailed flow diagram of a program for reading bar codes and updating the microprocessor with information relating to the present position of the film;

FIG. 29 is a detailed flow diagram of a plus 1 program for the microprocessor;

FIG. 30 illustrates the position of bar code sensors relative to the film and its bar codes when the film has come to rest, prior to the execution of the plus 1 program;

FIG. 31 illustrates a manual fiche carrier and a pair of sensors for detecting the presence and position of the manual fiche carrier; and FIG. 32 is a detailed flow diagram of a program for reading and debouncing the keys on the keyboard of a manually loaded fiche program.

Briefly, the reader, printer, or reader/printer (FIG. 1) comprises a hood 50, a film transport mechanism 51, and a control panel 52. The hood 50 includes a rear illuminated screen 54, in front of a cavity large enough to sustain a beam of light which contains the projected microfilm image on a single photographic area.

The transport mechanism includes a supply (relative to forward film transport) roll or reel 56, a take up roll or reel 58 and a web or length of film 60 extending therebetween. Preferably the reels 56, 58 have spools, hubs, or film cores with as large a diameter as possible so that there will be a minimum of internal working within the web or film 60, itself. Any suitable number of guide rollers may also be provided (as shown at 62, 64) to convey the film 60 smoothly and evenly through the reader/printer. As the film travels between rollers 62, 64, it passes between two flat glass plates 66, 68 (usually called "glass flats") which are closely spaced to hold the film, and therefore the microfilm images, at a precisely positioned, vertically oriented location relative to the lens system (not seen in FIG. 1).

In order to load a web or strip, such as film 60, into the reader/printer of FIG. 1, the web or strip is pulled from the hub, reel, or core 56, passed over roller 62, between the glass flats 66, 68, over rollers 64, and attached to the hub, reel or core 58. The hubs, reels, or film cores are internally keyed so that they will not fit over spindles located in the cavities 70, 72, unless they are properly positioned and the strip or film is properly oriented.

Cover plates (not shown) may be provided to prevent accidental removal of the film and to prevent entry of dirt or other foreign matter into the cavities 70, 72. For security, these cover plates may be protected by a lock and key.

The control panel 52 includes a photographic area address selector in the form of a plurality of push buttons 74 and a rotary switch 76. The rotary switch may be turned to select the address code of a book and the push buttons may be operated to select an address code of a chapter in that book. In the example of a large service parts center, the book might be "lawn mowers" and the chapter might be "engines". Therefore, the switches 76, 74 may be marked directly with these words. This way, the service or repairman using the reader/printer may follow his customary procedures of selecting book and chapter, which procedures he conventionally followed before he received the microfilm.

Any other additional control, such as switch 75, may be provided to switch the reader/printer or lamp off/on or to cause any other suitable functions.

Once the photographic area representing a book and chapter has been automatically delivered to a reading and/or printing or viewing position, it remains stationary. The operator grasps a handle 77 and moves it over an index printed on plate 78. When handle 77 reaches a selected point, a desired index on the plate 78 appears in a window 80 associated with handle 77, and a corresponding page or image on a photographic area on film 60 is projected onto the reader/printer screen 54.

A special "Plus 1" push button 81 is provided to extend the chapter by advancing the film transport to display the next photographic area, when a chapter contains an overflow of information wherein more than one of such areas is identified by a single chapter address code. When the film reaches the last overflow or "plus 1" photographic area in a chapter, the roll of film automatically rewinds to again present the first photographic area at the address of the selected chapter, if the "plus 1" button 81 is again pushed.

A thumb wheel 82 on handle 77 may be turned to focus the image projected onto the screen 54.

Figure 2:
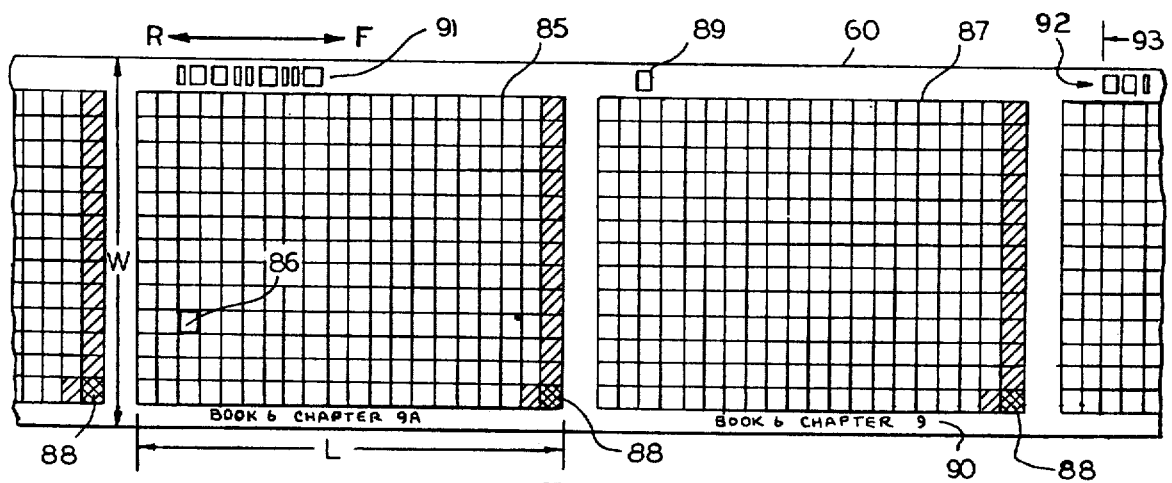
FIG. 2 is a schematic layout of a web or strip of roll film, having a plurality of photographic areas, each in a microfiche format comprising an orthogonal array of images, with a special bar code printed along an edge of the film and located near the photographic area which it identifies.

FIG. 2 shows a small section of film 60 and illustrates how the photographic areas are arranged thereon and identified by bar code addresses. In greater detail, each photographic area (85, for example) may have any convenient length "L" and a width "W", approximately equal to the width of the film, with suitable allowance for margins. Each photographic area includes a number of individual images (one of which is outlined at 86 for easy identification). The images on the photographic area are arranged in an orthogonal layout. A suitable index or table of contents may be provided near one edge of each photographic area, as indicated by cross hatching at 88.

The drawing has been marked at 90, by way of example, to indicate that the images on photographic area 87 are identified by the address "Book 6, Chapter 9", which is also indicated by the bar code 92 address. The letter "A" on photographic area 85 implies that chapter 9 is so large that it overflows and extends over a plurality of photographic areas. The user realizes that he must go on to another or overflow photographic area and he pushes the special "plus 1" push button 81 (FIG. 1) to cause the reader/printer to advance from photographic area 87 to overflow photographic area 85, where a special single mark bar code 89 is encountered. If the "plus 1" push button 81 is pushed again, the transport advances a second time, looking for another single mark bar code. However, this time a standard bar code 91 is found. Therefore, the second operation of the "plus 1" push button 81 causes the film to briefly rewind and to again display the initial photographic area 87 in Chapter 9. This "plus 1" process of advancing to the next or overflow photographic area, one at a time, may be repeated as often as required.

A series of bar code addresses (such as 89, 91, 92) is printed along one margin of the film and precisely located at the same relative positions near each photographic area. Therefore, if the bar code 92, for example, is precisely positioned by the film transport mechanism so that a sensor is at one edge, such as 93, of the code 92, the photographic area 84 is precisely located in the viewing area or in the optical path of the reader/printer.

Figure 3:
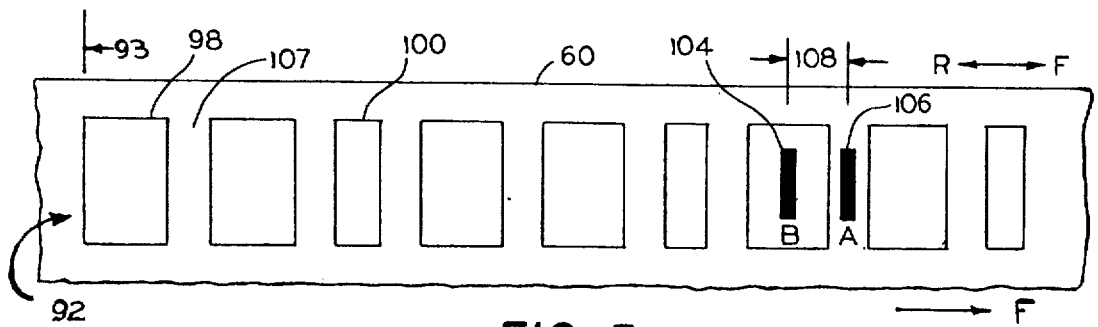
FIG. 3 shows an exemplary bar code used to identify each photographic area on the roll.

The nature and function of the bar code is shown in FIG. 3. There are a number (here nine) of spots or marks arranged in a series and in a distinct geometry. Each binary "1" is a wide spot or mark, as at 98, and each "0" is a narrow spot or mark, as at 100. Each wide spot 98 is exactly twice as wide as a narrow spot 100. A pair of sensors or transducers 104, 106 are positioned adjacent the edge of film 60 to read the bar code as the film passes adjacent them. For example, if the spots or marks 98, 100 are dark areas recorded on transparent film (or transparent marks on dark film), the sensor or transducers 104, 106 may include light sources on one side of the film and photocells on the other side of the film. The width of the space 107 between each spot or mark is exactly the same as the width of a narrow spot 100. The sensors or transducers 104, 106 are separated by a distance 108 which is exactly equal to 1.5 times the width of a narrow spot or mark 100.

According to the invention, it is totally irrelevant whether the film travels from left to right or from right to left. Neither direction is preferred. However, it is convenient to have an expression for distinguishing between these two directions. Therefore, one direction is arbitrarily called "forward" and the other "reverse". This same arbitrary terminology is used to identify "forward" and "reverse" motors which drive the film in those respective directions.

It should be noted that B sensor or transducer 104 encounters the bar code 92 before the A sensor or transducer 106 encounters it, when the film travels in a forward direction. The A sensor encounters the bar code first when the film travels in the reverse direction. There is no problem, however, since the recording sensor drives into one side of a shift register when film moves in one direction and into the other side of that same shift register when film moves in an opposite direction. The shift register marks the same output conductors responsive to the same code, regardless of which direction the film is driven.

Figure 4:
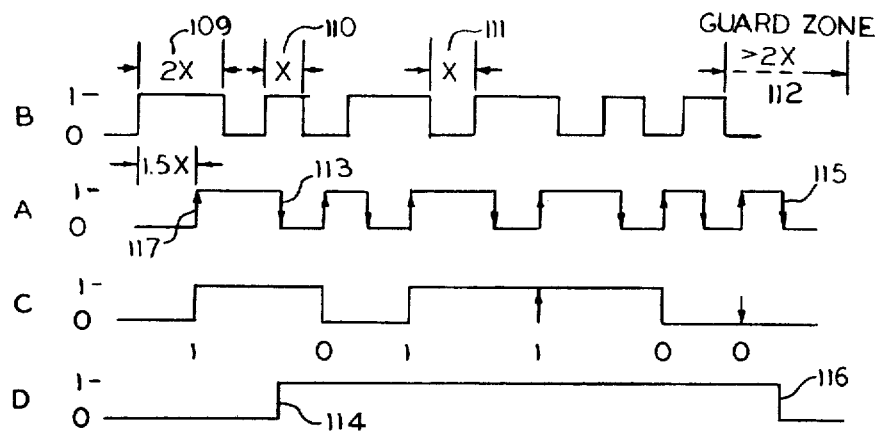
FIG. 4 is a graphical representation of how the bar code is read.

FIG. 4 graphically shows how the outputs of the sensors or transducers are interpreted by the associated electronic control circuits. (There is no correlation between the codes of FIGS. 3, 4.) The sensor output pulse 109 is wide, responsive to a wide spot or mark. A narrow spot or mark 100, produces a narrow pulse 110, and a space 107 between spots or marks are indicated by narrow spaces 111 between pulses. The relative widths of the pulses and spaces, and of the distance between the sensors or transducers are indicated in FIG. 4 by "X", "2X" and "1.5X". Each bar code has a guard zone 112 on one end, in which zone another bar code is forbidden. At any distance beyond the end of this guard zone which is greater than 2X (i.e., more than a wide spot or mark), a new bar code may begin. Therefore, a photographic area does not have to have a fixed and standard length. There is no need for a guard zone on the other end of the bar code because that space is protected by the next adjacent bar code.

The output of sensor or transducer B is shown by curve B of FIG. 4 and the output of sensor or transducer A is shown by curve A. Note that the output A is the same as the output B, except that there is a lag of 1.5X between the two outputs. If the direction of film travel is reversed, the pulses in curve B will lag after those in curve A, because the sensor A encounters the bar code before sensor B encounters it in reverse film travel.

The A sensor functions as a clock or strobe for reading the B sensor. This way, it is not necessary for a clock to maintain a precise synchronization between the film transport and the code reader/printer. In greater detail, curve A has been marked with arrow heads to indicate whether the transitions in the output of sensor or transducer A are going positive or going negative. In this example, the associated logic circuitry is arranged to read the output of the B sensor or transducer, each time that the transition in the output of the A sensor or transducer is going positive, as at 117, for example. Curve B is marked at the left-hand end to indicate the voltage levels representing a "1" and a "0".

By inspection, it will be seen that curve C represents the state of the output of the B sensor or transducer, at the instances when the positive going transitions occur in the output of the A sensor or transducer. Thus, the logic circuitry "sees" the binary word "101100", as indicated by Arabic numerals below curve C. By recalling that each wide pulse in curve B is a binary "1" and that each narrow pulse is a binary "0", it is apparent from an inspection of FIG. 4 that the code originally read by the B sensor or transducer has been correctly interpreted by the logic circuitry.

Curve D is a parity envelope generated as a function of the start and stop of a bar code. This envelope is generated responsive to the negative going transitions in the output of the A sensor, under the clocking assumptions of FIG. 4. The first negative going transition 113 in the output of the A sensor or transducer triggers a start of a code detection parity envelope, as indicated at 114 in curve D. As long as the A sensor goes negative while the B sensor is "high", bar code continues to be read from the film. Hence, the parity control envelope, curve D remains "high". When the negative going A sensor output occurs while the B sensor is "low", the parity envelope collapses or terminates, at 116. At this time, a negative going A sensor transition counter reaches a specific count if there is code parity. The sensors should have read the last output in a bar code if the negative going transition 115 occurs while the B curve is low, which indicates an end of a bar code. The curve D goes from "high" to "low", as indicated at 116. The end of code signal 116 occurs on the sixth negative going transition (curve A) in FIG. 4 or the ninth transition in the code of FIG. 3. Since the number of spots or marks are the same in all bar codes, there is a parity check because the proper number of spots or marks must be registered at the time when curve D goes negative. (In the example here given, the parity check occurs when the circuit counts the correct number of down going transitions between edges 114, 116, inclusive).

There are several ways that clocking may be done, when the film reverses its direction of travel. One way of clocking is to cause the lagging sensor to always act as a clock for the leading sensor. This way, the two sensors interchange their respective functions when the film transport reverses the direction of film travel. Another way of clocking is to cause the normal output of one of the sensors to act as a clock when film moves in one direction and a complement of that output to act as a clock when the film moves in an opposite direction. Regardless of which of these clocking systems is used, care should be taken to insure that there is a uniform and consistent parity check envelope (curve D) for a full and complete bar code, regardless of the direction of film travel.

The advantage of interchanging the roles of the two sensors is that the parity envelope (FIG. 4D) is automatically the same, regardless of the direction of film travel. The leading edges of the trailing sensor pulses always test the status of the leading sensor, for the reading of a binary signal. The trailing edges of the trailing sensor pulses always test the status of the leading sensor for generating the parity envelope. In the complementary method of parity checking, the leading edges of the trailing sensor pulses test the status of the leading sensor, for reading a binary signal in the forward film travel direction. For reverse film travel, the trailing edges of pulses from the leading sensor test the status of the trailing sensor for reading a binary signal. The parity envelope on reverse travel will require a reversal of the roles so that the trailing sensor will test the leading sensor in order to trigger the collapse of the parity envelope.

The film is transported responsive to an operation of switches on control panel 52, to automatically select and display a desired photographic area. More particularly, FIGS. 5, 6 help explain how a roll of film is transported, in order to bring a selected photographic area into the viewing area in the reader/printer of FIG. 1 responsive to a reading of the bar codes of FIGS. 2–4. FIG. 5 graphically shows film 60 traveling a forward direction and FIG. 6 shows the same film 60 traveling in a reverse direction.

The memory of the last read bar code is stored, so that the reader/printer always starts in the correct direction. But, if that memory has been lost (for example, there might be a power interruption), the reader/printer starts in one preferred direction. One bar code is read, and the electronic control circuit decides whether the film is or is not traveling in the correct direction. If it is, the film continues to so travel. If not, the film transport reverses direction.

It should be noted that every code is checked, while it is being read, to determine whether it is greater or less than the desired code. Hence, the direction of film travel is reversed whenever a code indicates that it is traveling in the wrong direction.

In either direction of travel, it is always necessary for the film to stop at the same position relative to the bar code. For example, as FIGS. 2 and 3 are drawn, it is desirable for the film to always stop with the A sensor or transducer head 106 (FIG. 3) aligned with the left hand edge 93 of the bar code 92, regardless of whether the film travels in a forward or reverse direction.

FIG. 5 shows how the film is so stopped from the forward travel motion, 184. Initially, the film transport is commanded to travel at a high searching speed. When the control circuit first recognizes a bar code corresponding to its commanded code, the film transport may be traveling at a very high speed if it has been running long enough to get up to its maximum speed. Since the transport mechanism is a mechanical device with inertia, the film 60 may coast one or more bar codes beyond the desired photographic area. The transport reverses direction 186, and it thereafter travels at a slow speed. When the desired bar code is again recognized, the transport reverses once more. At slow speed, inertia does not carry the transport as far as it does at high speed. However, the film may still coast by at least some discrete distance.

During this homing sequence, the deceleration is always greater than the acceleration, each time that the film transport reverses direction; thus, coasting becomes progressively smaller, as graphically indicated by the lengths of arrows in FIGS. 5, 6. Therefore, the transport mechanism reverses (188) direction a number of times (here up to six times), moving the film slightly less on each reversal, until the leading edge 93 of the bar code is precisely under the A sensor or transducer head 106 (i.e., at the point 115 in FIG. 4). Accordingly, the edge 93 moves back and forth under sensor A in diminishing amounts of travel. After a certain number of reversals have occurred, the homing sequence is complete and the film is positioned.

When the film is traveling in the reverse direction (FIG. 6), the control circuit again looks for a bar code corresponding to its command code. However, it would be expensive and awkward to require the homing to be performed in two different ways depending upon the direction of film travel during high speed searching. Therefore, once the bar code corresponding to the command code is encountered during high speed searching in the reverse direction 189, the transport mechanism reverses its direction of travel without immediate effect and before the homing sequence begins. This means that even on reverse direction searching, the film is traveling in forward direction 184 when the homing sequence is initiated. Thereafter, the homing sequence is the same as the sequence used in the forward direction.

The electronic control circuit is seen in FIGS. 7, 8. Briefly, the rotary and push-button switches 74, 76 (FIG. 7) send the command code signals into a microprocessor 192, which may be any of many commercially available products. While any of these products may be used, the invention currently employs the well known F8 microprocessor system components made by the Fairchild Camera & Instrument Corporation.

The A,B sensors or transducers 106, 104 transmit the sensed signals (FIG. 4) into the microprocessor 192 via switching amplifiers 194, 196. The microprocessor energizes a glass flat solenoid 197 via a driver amplifier 198. The microprocessor controls the direction of film travel by selectively energizing "FWD", "GO" and "REV" wires 200. The "FWD" and "REV" wires are energized with a steady d.c. potential to select the direction of film transport travel. The "GO" wire is energized with either a steady d.c. potential to command the forward (F) and reverse (R) motors 202, 204 to turn at high speed or with an interrupted d.c. potential to command the motors to turn at a low speed. The actual low speed depends upon the percentage of a duty cycle during which the GO wire is marked with the interrupted d.c. potential. These command signals are fed to the motors 202, 204 via two individual driving amplifiers 206, 208, which are essentially "AND" gates.

Each of the motors 202, 204 is mechanically connected in any suitable manner to drive one of the associated film cores. Forward motor 202 drives the take up film core 58 (FIG. 1) and reverse motor 205 drives the supply film core 56.

FIG. 8 shows the logic diagram of an electronic control circuit which may be used to complete the block diagram of FIG. 7. The control switches 74, 76 are part of a matrix 212.

The matrix 212 comprises horizontal and vertical multiples defining a plurality of crosspoints. Each switch 74, 76 has a set of contacts connected across the matrix crosspoints. For example, one set of switch controlled crosspoint contacts, shown at 209, are here assumed to be the only ones closed by an operated push button 74. Of course, any other crosspoints could also be the closed ones.

Scanner 210, which may be part of the microprocessor, initially applied ground G to the upper most horizontal H1 in matrix 212. All other horizontals are marked with the positive potential P1. All verticals are marked with positive potential P2.

Scanner 211, which may also be part of the microprocessor, sequentially tests the potential on each vertical in matrix 212, and finds only potential P2 because the above assumption, in this description, has been that only crosspoints 209 are closed.

After scanner 211 completes one scan, the scanner 210 is operated to remove ground G from the uppermost horizontal H1 and to apply it to the next lower horizontal H2. The scanner 211 finds potential P2 on vertical V1. However, vertical V2 is connected through contacts 209, assumed to be closed, to ground G.

Immediately, the control circuit recognizes that it has found the closed push-button contact and scanner 210 is advanced in its cycle to apply ground G to horizontal H5. Again, the scanner 211 searches for a ground applied through a selected set of contacts on rotary switch. If the closed rotary switch contact is on horizontal H5, the control circuit stops the scanners. If not, scanner 210 is advanced to apply ground G to horizontal H6 and scanner 211 searches for it. One way to prevent contact bounce is to require the scanners to find the same contact closure a predetermined number of times before accepting the signal as a valid one.

It should now be apparent that the matrix 212 enables the electronic circuitry to ascertain the commanded code responsive to a selective operation of a push button 74 and rotary switch 76.

The logic of the microprocessor 192 is represented at 214 (FIG. 8 and shown in detail in FIG. 11). For completeness both FIG. 8 and FIG. 11 repeat the sensors or transducers 104, 106 and amplifiers 194, 196. Each of the sensor amplifiers 194, 196 include a buffer amplifier 216, 218 (FIG. 8) followed by individually associated trigger circuits 220, 222, preferably Schmitt triggers. This way, the logic circuitry 214 receive unambigeous sensor originated signals (FIG. 4) responsive to each detection of a bar code spot or mark.

The remainder of FIG. 8 shows a circuit for driving the film transport mechanism and for maintaining film tension. This portion of the figure is divided by a dot-dashed line 224, with the driving amplifier 206 shown above the line and driving amplifier 208 shown below the line. Since circuits 206, 208 are the same, only circuit 206 will be explained.

The forward FWD and reverse lines REV are connected to individually associated AND gates 226, 228. Thus, the AND gate 226 conducts when the microprocessor 192 energized the FWD and GO wires. The AND gate 228 conducts when the microprocessor energizes the REV and GO wires.

The output of AND gate 226 is fed into an OR gate 230 which energizes a motor drive circuit 232. The motor drive circuit supplies a d.c. voltage to forward motor 202. If the motor 202 is in the fast drive mode, there is a steady state d.c. potential. The microprocessor 192 energizes the GO wire continuously and without interruption. Drive circuit 232 then applies a maximum d.c. power to the motor 202, which runs at high speed.

When the desired bar code is detected, the motor 202 is stopped. The microprocessor signal for stopping the motor is a simultaneous energization of the FWD, REV and GO wires, so that the two motors pull against each other. The potential on the GO wire is interrupted, first slowly and then at a progressively faster rate. After the frequency of interruptions passes a critical high frequency rate, the system can no longer follow the interruptions and the motors stop with the initially undriven motor acting as a drag upon the film to maintain film tension and help stop the driven motor.

When the motor 202 is driven in a slow drive mode, there is a problem since frictional forces may vary from system to system, with the amount of film which has been wound upon the driven reel, etc. For the same slow speed, the amount of energy supplied at any given time may vary from the amount that must be supplied at any other time. Accordingly, when the combination of signals sent from the microprocessor logic 214 over the FWD and GO leads to motor drive circuit 232 indicates a slow speed, the motor drive circuit 232 preferably applies energy to the motor in the manner indicated by FIG. 9, wherein speed is shown on a vertical scale and torque on a horizontal scale. Initially, a very low voltage is applied to forward motor 202 at a potential which is here arbitrarily designated "X". If the motor does not turn, the potential is gradually increased to "X2". If it still does not turn, the voltage is increased to "X3", etc. Eventually, the motor begins to turn.

In order to so increase the potential applied to the motor 202, the slow speed indicating intermittent interruptions on the GO wire begin as narrow pulses which are gradually made wider, with a rising ramp front characteristic. As the GO wire is energized during progressively longer periods in the interruption duty cycle, the motor 202 runs at progressively faster (but still relatively slow) speeds. Hence, as soon as the instantaneous friction is overcome in the motor, it starts slowly and thereafter builds speed, with the acceleration characteristics depicted by line 233 in the graph of FIG. 9.

Whenever either motor (the driven motor) is operating to pull the film, the other motor (the undriven motor) is energized with a weak current. The undriven motor supplies only enough torque to act as a drag and thereby maintain film tension. The control of this drag is extremely important since it maintains a uniform film tension. Otherwise, the turns of film on a reel might alternately loosen and cinch, and therefore, damage the film. Accordingly, there is a need for the microprocessor to precisely control the current supplied to the undriven motor.

FIG. 10 explains how the current supplied to the undriven motor is controlled and regulated to maintain a predetermined film tension. In greater detail, when the forward motor is first energized, it draws current which shoots up from a zero axis to the point 240, FIG. 10A. As the motor begins turning, the current falls off, with some decaying characteristics, as indicated between the points 240, 242.

Current sensor 244 is a trigger circuit connected to the output of the motor drive circuit 232 to detect current drawn by the motor, as depicted in FIG. 10A. The sensor 244 detects when the current falls to the point 242, and thereupon sends a signal over wire 250 to AND gate 252. The other input of AND gate 252 is already energized via the FWD wire and the output of AND gate 226. Thus, when the forward motor 202 is operating, AND gate 252 applies a signal through OR gate 254 to motor drive circuit 256 and reverse motor 204.

Upon energization, reverse motor 204 acts as a drag upon film 60 and therefore upon forward motor 202, which must then draw more current from the motor drive source 232. Current sensor 244 uses a trigger circuit which switches OFF when there is an increase of current in the motor 202. The current to reverse motor 204 is removed. Thus, the motor drive circuit 256 has received a pulse of driving current, as indicated by pulse 258 (FIG. 10B). A deenergization of the reverse motor 204 reduces the drag upon film 60 and forward motor 204, and the cycle repeats.

The motor drive circuit may also operate on an analog basis, if desired.

Hence, as long as the driven forward motor 202 continues running (Curve A, FIG. 10), its energizing current fluctuates while motor 202 hunts for current film tension or motor torque, as shown at 260. The undriven reverse motor 204 is pulsed, as shown at 262, responsive to current fluctuations 260. Thus, the undriven motor receives a low level d.c. energy, which is an integration of and derived from an average of the pulses 262. This low level of current causes the reverse motor 204 to resist turning and thereby maintains a steady tension upon the film 60.

Between the outputs of AND gates 226, 228 there is an interlock circuit designed to keep the motors from being driven at any time when the mechanical parts of the reader/printer are not in a condition for the film to travel safely. In greater detail, a plurality of any suitable mechanical switches 264 are connected in series between ground and a voltage divider comprising resistors 266, 268, 270. These switches 264 may be "Microswitches" actuated by mechanical reader/printer parts, such as the movable glass flat 68 or any other mechanical parts, all of which should be in a normal condition before the film may be safely transported. If all of the switches 264 are properly closed, ground is applied to the base of transistor 272, which switches off. Thereafter, the outputs of AND gates 226, 228 may be effective upon the motors 202, 204. However, if one or more of the interlock switches 264 is opened, the potential set by voltage divider 266, 268, 270 establishes a base bias which switches on the transistor 272, to apply ground to a junction between diodes 274, 276, which are connected to the outputs of AND gates 226, 228, respectively. Thereafter, the outputs of "AND" gates 226, 228 are clamped to ground, and the motors 202, 204 cannot be commanded to operate.

When the electronic control circuit of FIG. 8 finally stops the film, a desired photographic area is accurately positioned in a viewing position between the glass flats 66, 68 (FIG. 11). More particularly, the bar code reading head sensors or transducers 104, 106 are located at any convenient point along the travel path for film 60. For example, if the bar code 92 (FIG. 2) is printed at a proper position on the film 60, photographic area 87 is precisely positioned between glass flats 66, 68, when one edge 93 (FIG. 2) of the bar code is directly under one of the sensors (here assumed to be A sensor 106).

FIG. 11 shows the basic principles of the logic 214 for the microprocessor 192 of FIGS. 7, 8. Those components which appear in FIG. 11 and other figures are identified by the same reference numbers. The portions of FIG. 11 which are not part of the microprocessor are enclosed within blocks outlined by double dot-dashed lines. The operative portions of the microprocessor are separated by dashed lines.

The basic or master control for the microprocessor 192 is a timed enabling device or allotter 300. It causes each of a number of different functions to be performed in an orderly sequence. As here shown symbolically, the allotter is a clock having a single rotating hand 302 which sequentially touches conductive segments 1-0 in order to individually enable the various circuits shown elsewhere in FIG. 11.

The allotter 300 steps periodically under control of a free running oscillator (not shown). The allotter 300 may be stepped forward or backward, depending upon control signals sent from circuit 301. Normally, the hand of allotter 300 is to be viewed as rotating step-by-step in the clockwise direction D. However, each time that the allotter hand 302 reaches segment 3, it automatically steps backward to segment 2, responsive to the next pulse from the free running oscillator, unless gate 304 is inhibited. Accordingly, the cyclic repetition of signals from the segments 2, 3 provides means for cyclically reading the comparator 336 and the A, B sensors 106, 104. When the comparator finds equality in the stored and read codes, the cyclic reading is interrupted and a stopping sequence begins when the allotter reaches the fourth segment. On the fifth segment, the film comes to rest and the allotter stops to hold the film in its stopped position. On the next command to find a photographic area, the allotter steps over the zero segment to restore all circuits to normal. Then the sequencing beings again when the allotter reaches segment 1.

The other major subdivisions (set off by dashed lines) of the circuit of FIG. 11 are the A and B sensor circuits 306, 308, code input circuit 310, keyboard 312, keyboard control circuit 314, debounce circuit 316, valid code detect circuit 318, transport control circuit 320, find mark circuit control circuit 322, and speed control circuit 324. A "plus 1" circuit 325 enables the film transport mechanism to advance one photographic area section at a time, as explained above in connection with the special bar code 89.

Means are provided for storing an address of a desired photographic area responsive to an operation of a selected key in the keyboard 312. In greater detail, the instantaneous position of the allotter 300 determines the sequence in which the various circuits operate. By inspection, it is seen that the first circuit to operate (i.e., responsive to a signal from allotter segment 1) is debounce circuit 316. Responsive to a signal applied simultaneously to a lower input of AND gate 326 and to a monostable flip-flop 328, there is a period of time, indicated by pulse 330, during which the flip-flop 328 is "high" at terminal Q and "low" at terminal $\bar{Q}$. Then, after pulse 330, the flip-flop 328 outputs go high at terminal $\bar{Q}$, whereupon AND gate 326 conducts. The duration of pulse 330 is adequate for any contact bounce to subside, in keyboard 312.

Responsive to an output from AND gate 326, an enabling signal is applied to AND gate 332. If any switch in keyboard 312 has been operated, a selected combination of signals appears at the keyboard output terminals 334. These signals pass through AND gate 332, when it is enabled from the output of AND gate 326, after the end of the debounce period.

Thus, the bar code address of the demanded photographic area is stored in a comparator 336 while the allotter is on segment 1, according to the operation of a key in keyboard 312.

When the allotter 300 reaches segment 2, a series of AND gates 338, 340, 342 are enabled, which commands the transport mechanism to start reeling the film. The direction of reeling depends upon information, if any, which may be stored in the code input circuit 310 prior to an operation of the key. It is here assumed that no information has been stored previously. Therefore, the film transport mechanism may begin reeling in either a forward or a reverse direction (one preferred direction is usually built into the circuits).

Means are provided for reading the bar codes as the film is reeled, responsive to the allotter reaching segment 3. Also, responsive to the allotter output from segment 3, an AND gate 304 conducts to cause allotter 300 to step back to segment 2, unless gate 304 is inhibited by a location of the desired photographic area. Actually, the allotter is operating at a suitable sampling speed and the film transport is operating with mechanical inertia. Therefore, the film runs smoothly and without interruption despite the allotter switching back and forth between segments 2 and 3.

The A and B sensors 306, 308 and the circuits 194, 196 are connected in parallel with wires J and K which may be used when a third sensor is employed to detect the direction of film movement, as disclosed in FIG. 14. Normally, wires J and K are not used.

One embodiment of the reading principle was described above in connection with FIG. 4. There, it was explained that one way of clocking is to interchange the roles of the A and B sensors, depending upon the direction of film travel. A second embodiment is shown and described in FIG. 12, comprising two graphical parts 346, 348, which refer to film travel in reverse and forward directions, respectively. It will be noted that FIG. 12 is drawn so that the positions of sensors A, B, the bar code 92 and the clock symbols (arrow heads) on sensor A output are reversed in these two parts 346, 348. Upon reflection, it will be seen that these drawing reversals amount to film travel reversal. In each case, it may be assumed that either the bar code 92 moves to the left (arrow E) or the sensors move to the right (arrow G). This reversal symbology is here used so that the clock pulses 350 may be shown in the graph with apparent movement toward the right, since time is normally depicted by such rightward movement.

When A sensor is first over a code mark area (e.g., mark 349) of bar code 92, there is an upward movement or leading edge 352 in a graph of a pulse in the A sensor output. When the A sensor moves off a code mark area, there is a downward movement or trailing edge 354 in the output of the A sensor. In the embodiment of FIG. 12, as distinguished from the embodiment of FIG. 4, sensor A is always used as the clock for reading the output of sensor B. The arrow heads indicate when the output of the B sensor 104 is read (i.e., on the leading edge 352 in forward direction and the trailing edge 354 in the reverse direction). By inspection, and recalling the description of FIG. 4, it is seen that the output of the B sensor accurately reflects the binary information embodied in the bar code 92, regardless of whether the film is traveling in a forward or a reverse direction.

The code input circuit 310 (FIG. 11) provides means for storing the bar code as it is read by the B sensor. In greater detail, a shift register 356 has a clock input 358 controlled from A sensor 106 on either the leading or trailing edge of the sensor A clock pulses, as indicated in FIG. 12. The shift register 356 has an input 360, 361 controlled by B sensor 104. The direction of film travel is sensed at shift register 356 responsive to a signal on wire 362, which controls an exclusive OR gate 364 and which selectively marks a shift left terminal SL. If the shift left terminal SL is not marked, the shift register 356 shifts to the right.

The A sensor clocking of the shift register input is controlled this way. When A sensor 106 is over a bar code mark, amplifier 194 produces a pulse 366. For the duration of such pulse, an inverter 368 (FIG. 11) switches off its output so that AND gate 370 cannot produce an output. Simultaneously, AND gate 373 is energized by pulse 366. If the film is traveling in a reverse direction, wire 362 is not energized so that AND gate 372 conducts to clock the A sensor pulses into shaft register 356 responsive to the leading edge of pulse 366. However, if the film is traveling in the forward direction, wire 362 is energized to inhibit AND gate 372 so that there is no output responsive to the leading edge of the A sensor pulse 366. In this case, AND gate 370 conducts when inverter 368 switches its output on responsive to the trailing edge of pulse 366 (i.e., when the individual code marks pass out from under sensor A). Thus, as shown at 346 (FIG. 12), the clock pulses from the A sensor are effective on the leading edge when film travels in the reverse direction and on the trailing edge when film travels in a forward direction. Either way, the outputs of the gates 370, 372 are conducted through OR gate 374 to an AND gate 376.

From FIGS. 4 and 12, it will be recalled that the mark (a binary "0") in the bar code is one unit wide while the sensors are separated by one and one-half units. From FIG. 12, the B sensor is always read on the leading or rising edge 352 of the A sensor output for reverse film travel and on the trailing or falling edge 354 for forward film travel. A validity or parity check is made on the edges (not marked by arrow heads) of the A sensor output pulses which are opposite to the edges used for clocking. Responsive thereto, the geometry of an envelope (curve D in the various figures) of the bar code is compared with pulse train produced. Care is taken to be sure that the geometry of this parity envelope is identical for both directions of film travel. Clocking on one edge and validity checking on the opposite edge, effectively reduces the spacing between the sensors so that at the time of validity checking the B sensor always has an output responsive to any mark in the bar code, when it is read on the clocking edge.

Means are provided for checking the apparent validity of the bar code, as read from the B sensor 104. In greater detail, the A sensor 106 output is also applied from OR gate 374 to a code validation circuit 318. Inverter 378 conducts at all times, except when there is an output from OR gate 374. When there is an output from OR gate 374, the inverter 378 switches off. Hence, the effect of inverter 378 is to read the edge of the A sensor output pulse 366 which is opposite to the clocking edge of pulse 346.

The B sensor 104 feeds its output to the D terminal of a memory circuit 380, which reads and remembers the output of the B sensor each time that inverter 378 enables a read in. As a result, the memory circuit 380 is set to a "high" potential state for the duration of the pulse train resulting, from a valid reading of the bar code by the B sensor.

Responsive to the output potential at terminal $\overline{Q}$ of memory circuit 380, a "high" potential is applied to the "clear" input CLR of shift register 356. The small circle or bubble 382 indicates that the "CLR" (or clear terminal) is "low" when the memory output is "high". Thus, shift register 356 may store the pulses received from B sensor 104.

However, if the B sensor 104 output does not recur within the period permitted by the memory 380, there is an interruption for a period which is long enough to cause the output potential at terminal Q of memory 380 to go "low". When this interruption occurs, the CLR terminal goes "high" to erase the memory stored in shift register 356. The result is that the shift register is cleared if an invalid (less than a full complement) code is received or at the end of a complete bar code, whichever occurs first. From a comparison of FIGS. 4 and 12, it will be seen that there is a period of time equal to the width of the last A sensor pulse (at 115, FIG. 4) during which the bar code stored in shift register 356 may be effectively transferred to comparator 336, before it is cleared responsive to the signal from memory 380.

If the film is traveling in a reverse direction, the output from B sensor 104 is read into shift register 356 (with shifting in a right hand direction) each time that a clock pulse from A sensor 106 appears at the output of AND gate 376. This AND gate output may appear during the third segment in the operation of the allotter 300.

If the film is traveling in a forward direction, a signal feeds back over wire 362 to a shift left (SL) terminal. This means that the bar code information read by the B sensor is shifted in a leftward direction each time that a clock pulse from A sensor 106 appears at the output of AND gate 376. Thus, it should be clear that the same information is stored in shift register 356 responsive to the two bar codes 92, as shown at 346, 348 in FIG. 12.

It may be recalled that the information (T) derived from the encoded output of the keyboard 312 was stored in comparator 336 during allotter time segment 1. The information (S) derived from the bar code is stored in comparator 336, as it is read by the sensors. The comparator 336 compares this stored information (T) and (S) and gives an output 384 which indicates which (S or T) is greater or when the two are equal. When the value of stored bar code information (S) is less than the value of the stored keyboard information (T), the AND gate 338 conducts each time that allotter 300 segment 2 is energized. Likewise, AND gate 342 conducts when the bar code information (S) is greater than the keyboard information (T). When the bar code information (S) is equal to the keyboard information (T), the AND gate 340 conducts. A terminal S≠T is marked whenever the terminal S=T is not marked. The marking at terminal S≠T energizes the "Go" wire, also seen in FIG. 8.

The forward motor 202 is driven responsive a signal transmitted from AND gate 338, through contacts 386 and OR gate 388 to the forward driver amplifier 206 and motor 202, while the "Go" wire is marked via OR gate 387. Simultaneously, a signal is returned over wire 362 to indicate the forward direction of film travel to the exclusive OR gate 364 and to the shift register 356 (i.e., shift register 356 shifts leftwardly responsive to B sensor signals at input 360 when wire 362 is marked).

The reverse motor 204 is driven responsive to a signal transmitted from AND gate 342, through switch 390 and OR gate 391, to the driver amplifier 208 and the reverse motor 204, while the "Go" wire is marked via OR gate 387. Note that on reverse drive, no signal is fed back via wire 362 so that the shift register 356 stores bar code information by shifting rightwardly, responsive to B sensor signals at input 361.

As the film travels, there comes a time when the desired bar code passes under the A and B sensors. At that time, the signal switches from S>T through S=T to S<T or from S<T through S=T to S>T, as the case may be, since inertia of the moving transport system carries the film beyond the desired film area. At that same time, the AND gates 338 and 342 switch their conductive states. The formerly driven motor ceases to be driven, and the formerly undriven motor is driven. The reversal of the driven motor causes the film to move back in the reverse direction, as graphically shown in FIGS. 5 and 6.

Since the film has just reversed its direction of travel, it will not have had enough time to get up to speed. Therefore, the film is traveling relatively slowly when the desired bar code is next encountered. The comparator signal again passes from S<T or S>T (depending on the direction of film travel) to S=T. When the output is S=T, the marking disappears from the terminal S≠T. At that time the speed control circuit 324 modulates the "Go" signal applied via wire 406.

The AND gate 340 conducts to apply a signal to inhibit the AND gate 304. The allotter 300 ceases stepping back and forth between segments 2, 3. On the next pulses from the free running oscillator, the allotter 300 steps onto segments 3 and 4.

When the comparator 336 detects an approximate equality (i.e., the film is within one bar code of the desired photographic film area), an inhibit is removed from terminal 398 of the AND gate 400. This prepares the circuits to stop the film with a controlled deceleration curve.

After the inhibit is removed from the gate 400, the potential on the fourth segment of allotter 300 is applied to an astable multivibrator 404. Responsive thereto, the multivibrator begins to pulse "Go" wire 406 in order to interrupt the energization of the motors. Also, responsive to the output of the gate 400, the ramp control circuit 408 begins to gradually modulate the astable period of the multivibrator 404, as shown in FIG. 13. Initially the motor drive is energized for short periods of time and deenergized for long periods, as shown in the curve of FIG. 13A. As the ramp control circuit 408 progressively increases its output, the "On" durations from the multivibrator 404 become progressively longer, as shown in FIGS. 13B and C, and the motor receives progressively higher levels of energization.

This gradual control of film transport speed, responsive to a ramping of an energy interrupting duty cycle, produces three results. First, it eliminates the need for a tachometer. Second, it overcomes inconsistencies produced by variations of unknown film transport friction, without clutching. Third, there is a control over acceleration and deceleration so that the rate of deceleration always exceeds the rate of acceleration so that the film comes into final position without requiring braking.

As explained in connection with FIG. 9, there comes a time when the energy level which is progressively increased, creates a torque that overcomes the static friction of the film transport system. Thus, regardless of any variations in instantaneous friction the motor always begins to turn with the same characteristics, slowly at first, and then with increasing speed.

Since the film is almost correctly positioned at this time, there is not enough time for the transport mechanism to acquire any appreciable speed or inertia. The point is that the slowly increasing energy, caused by changes in the duty cycle of multivibrator 404, just overcomes static friction. Therefore, the film begins to creep along. Although, the current is increasing, the film will be stopped before it accelerates to any appreciable speed.

When the signal actually becomes and remains $S=T$, the AND gate 340 conducts to energize AND gate 402. On the fifth segment of allotter 300, AND gate 402 conducts and operates the MUX switch 392. Contacts symbolically shown at 386, 390 move to complete circuits through contacts 394, 396. The allotter 300 stands on the fifth segment until the next operation of a key on the keyboard 312.

Final positioning means are provided for finding an exact point in the bar code so that A sensor 106 is exactly aligned over one edge of a specific one of the selected bar code marks. More particularly, after the MUX switch 392 operates, the A sensor 106 is connected through terminals 394, contacts 386 and OR gate 388 to the forward motor driver 206. The A sensor is also connected through inverter 410 to terminal 396, contacts 390 and OR gate 391 to the reverse motor driver 208. This way, the forward motor drives when the A sensor has an output and the reverse motor drives when the A sensor does not have an output. The film repeatedly reverses direction, as often as may be desired for the film to come to rest with a bar code mark precisely positioned relative to the A sensor, as shown in FIGS. 5, 6. The exact nature of the final stopping position, relative to the A sensor, depends upon bias potentials used.

Any of various means may be provided for determining when the film is finally positioned. As here shown, the film reverses its direction a selected predetermined number of times which brings the film to rest within acceptable tolerance limits. Then, the film transport reversals are automatically stopped. Each of the motors is then energized at a reduced level in order to maintain film tension.

In greater detail, before the film transport control circuit (FIG. 11) goes into the find the mark sequence, the $S \neq T$ marking is applied over wire 413 to hold a reset condition on the film stop circuit 324, thereby inhibiting its operation. When S becomes equal to T, comparator 336 switches the marking from output terminal $S \neq T$ to output terminal $S=T$, which deenergizes wire 413 and thereby removes the inhibit from the film stop circuit 324.

When the A sensor 106 detects a bar code mark, flip-flop 414 generates a pulse which is transmitted through OR gate 415 to drive counter 416 and reset the ramp control circuit 408. When the A sensor moves off a bar code mark inverter 410 conducts and the flip-flop 417 operates with similar results. Each time that the ramp control circuit 408 resets responsive to a signal at terminal 420, the duty cycle of multivibrator 404 repeats the increase of energy level depicted in FIG. 13 and again causes energy to be applied at progressively higher levels to the driven motor. The duty cycle of the multivibrator 404 goes through the progression depicted by the curves 13A, B, C, in the order in which these curves are drawn.

After a selected number of film drive reversals have occurred, counter 416 reaches an output terminal 418. At this time, both of the OR gates 388, 391 are energized from output terminal 418 so that both of the motors 202, 204 are energized simultaneously, to maintain film tension.

At the same time, the signal transmitted from counter output terminal 418, through capacitor 419, reverses the ramp control circuit 408. This time the duty cycle of the astable multivibrator 404 progresses from a high energy level (FIG. 13C) to a low energy level (FIG. 13A), inversely to the order in which these curves are drawn. Thus, the "Go" wire is modulated via conductor 406 and OR gate 387. There is a reducing energy level duty cycle, which holds a constant film tension without enabling the motors to actually move the film.

The circuit remains in this condition until the next operation of a key in keyboard 312, at which time the allotter 300 steps off the fifth segment. On the zero segment of allotter 300, all circuits are reset to normal. Then, the circuit of FIG. 11 repeats the above-described sequence, when the allotter 300 reaches segment "1".

FIG. 2 illustrates a "plus 1" operation in its disclosure of a special bar code 89 which is a single wide mark. The user pushes a special key in keyboard 312 when he wishes to advance the roll of microfilm to display the next photographic area. It is somewhat similar to turning the page of a book. For this, the special key in keyboard 312 is equipped to transmit a special "plus 1" code. An AND gate 412 is wired to conduct whenever that special code is sent.

In greater detail, the "plus 1" control circuit is shown and explained by FIGS. 16–21. More particularly, FIG. 16 illustrates the possible differences between an exemplary two bar codes and "plus 1" code. The bar codes always include a plurality of long and short marks, as shown in FIG. 3; the "plus 1" mark includes only one long mark. Exemplary bar code 16A begins with a short mark 500 followed by a long mark 502 and any other combination of marks (not shown). Bar code 16B begins with a long mark 504, followed by a long mark 506 and any other combination of marks (not shown). Of course, the second marks 502, 506 may also be short marks; however, this distinction is totally irrelevant. The "plus 1" mark is a single long mark, not followed by any other combination of marks. Hence, the object of the "plus 1" mark is to enable the film transport to advance, responsive to a single wide mark, from photographic area to photographic area, one at a time, as explained above in connection with FIG. 2. If the advancing film does not contain a "plus 1" mark, it returns to the last bar code. This is somewhat similar to turning a page and finding the start of a new chapter, in which case, the reader may wish to return to the start of the chapter that he is reading.

FIGS. 17–19 are timing charts, similar to the chart of FIG. 4, for explaining the A, B sensor outputs responsive to the three codes of FIGS. 16A–C. Thus, for example, the bar code of FIG. 16A produces the outputs of FIG. 17. It should be noted that the first output pulse 510 of the B1 sensor curve occurs responsive to the bar code mark 500. Pulse 510 then disappears before the parity check envelope D1 goes "high" at 512 (i.e., sensor A goes "low" while sensor B is "high"). Likewise, in FIG. 18 the first output pulse 514 of the B2 sensor curve disappears before the parity check envelope D2 goes "high" at 516 (again sensor A goes "low" while sensor B is "high"). However, in the "plus 1" graph (FIG. 19), the parity check envelop D3 never goes "high" because sensor B is "low" when sensor A goes low.

Accordingly, the truth table of FIG. 20 may be drawn after an inspection of FIGS. 17-19. Cell 1 is taken from FIG. 17 and shows that if the parity envelope D goes high (i.e., is 1) and if the "1" bar code pulse is "0", cannot be a "plus 1" code. Likewise, cell 2, which is taken from FIG. 18, shows that there is no "plus 1" mark when the parity envelop D goes high and the "1" output is 1. There is a "plus 1" mark only when the signals are as shown in cell 3, where the parity envelope D is O (i.e., does not go "high") and there is a "1", or wide first pulse encountered by the B sensor. If the parity envelope does not go high and the B sensor has a "1", it means that there is one and only one mark in the bar code and that the one mark is no shorter than 2x or longer than 3.5x, using the nomenclature of FIG. 4. This combination virtually insures that the system will not respond to a smudge on the film.

FIG. 21 shows a circuit for operating the film transport responsive to an operation of a "plus 1". In greater detail, the "plus 1" key causes an AND gate 412 to conduct and drive a sequence counter 520 via OR gate 522.

The counter takes one step to initiate a first sequence whereby forward motor 202 is started via wire 524 and OR gate 526. Simultaneously, one input of AND gate 528 is energized. If the A sensor 106 is standing over a bar code mark, inverter 530 does not conduct. However, once the film moves far enough, the bar code mark clears the A sensor and inverter 530 switches on. The AND gate 528 conducts to step counter 520 via OR gate 522.

The counter 520 stands on its second step and the second sequence begins. Motor 202 continues to run responsive to the signal transmitted over wire 532 and through OR gate 526. The upper input of AND gate 534 is energized. After the film reaches the end of a photographic area, the next bar code moves under the A sensor 106. The lower input of the AND gate 534 is energized to step counter 520 via OR gate 522; the sequence counter step on to motivate the third sequence.

In the third sequence, the circuit looks for a detection of the "plus 1" bar code by the B sensor 104. The potential on wire 535 keeps the forward motor running and energizes the upper input of AND gate 536. Responsive to the B sensor reading a mark, AND gate 536 conducts to step the sequence counter 520 via OR gate 522.

It is now necessary to read the bar code to determine whether it is a single wide mark or a series of bar code marks. Accordingly, on the fourth step of counter 520, the motor 202 continues to run responsive to the marking on wire 538, and the upper input of AND gate 540 is marked. When the bar code mark moves away from the A sensor 106, inverter 530 energizes the lower input of AND gate 540 to step the sequence counter 520 to the fifth step.

However, if the B sensor 104 does not detect any bar code mark on the fourth step of counter 520, there is a problem and the "plus 1" sequence should be stopped. Accordingly, an inverter 544 conducts while no bar code mark is under the B sensor in order to mark the upper input of AND gate 552. When AND gate 534 conducts to step the counter 520 to the third step, the AND gate 552 conducts to start a timer 554. For a measured period of time the timer 554 holds an inhibit on gate 556. By the time that timer 554 times out, the B sensor 104 should have found a bar code mark, in which case, AND gate 536 conducts to continue holding an inhibit on the AND gate 556. The gate 556 is no longer capable of having an output after the sequence switch 520 step off its step 3. However, if the B sensor 104 has not found a bar code mark, the inhibit is not present at the upper input of gate 556 when the timer 554 times out. Therefore, gate 556 conducts to stop the "plus 1" sequence.

The fifth sequence occurs when both the A and B sensors 106, 105 are reading the mark (as shown in FIG. 19). Responsive thereto, inverters 530, 544 conduct, and acting through AND gate 546, energize the upper input of AND gate 548. The lower input of gate 548 is energized when the counter 520 is setting on its fifth step. Responsive to the output of AND gate 548, the MUX switch 392 (FIG. 11) operates and the transport goes into its find the mark sequence. When the mark is found, wire 550 is marked and sequence counter 520 steps to its sixth step, from which the circuit resets to normal.

The partly envelope cannot appear during a valid "plus 1" sequence, as will be apparent from FIGS. 16-20. If a parity envelope does appear, memory 380 produces a signal at its Q terminal. Responsive thereto, gate 548 is inhibited so that the MUX switch cannot operate, sequence counter 520 is reset to cancel the "plus 1" operation, and flip-flop 562 is set. The flip-flop 562 energizes the upper input of AND gate 564, where there is a coincidence with the output of the "plus 1" AND gate 412. Driver 208 and reverse motor 204 operates. The film is now driven backward through any number of "plus 1" area codes, each of which is marked by a single wide mark.

The output of AND gate 564 is applied through an OR gate 566 to step a counter 568 to its first or "1" step, where it marks the lower input of AND gate 567. Counter 568 remains on step "1" while the film rewinds. Eventually, the film comes to a full and complete bar code, which causes a parity envelope to reappear. The memory 380 conducts to mark the upper input of AND gate 567 and thereby feed back a signal through OR gate 566 to step counter 568 on to the Step "2". There, a signal is produced to reset flip-flop 562, deenergize AND gate 564, and terminate the "plus 1" circuit control over rewind. Also, the output of counter step 2 causes the circuit of FIG. 11 to go into a "find the mark" sequence to position the film on the full and complete bar code that was just found. While the transport is going through its find the mark routine, step 2 of the counter 568 holds an inhibit on gate 570 to prevent the OR gate from responding to a mark found signal. When the mark is found, the counter 568 is reset to deenergize the "2" output. This removes the inhibit from gate 570. Thereafter, the OR gate 522 is energized by the "mark found" wire 550.

Upon reflection, it is seen that the inventive "plus 1" is quite different from prior art circuits. For example, if the film in a prior art circuit is standing on frame "514", a "plus 1" would advance the film to "515", regardless of the information content of frame "515". In the inventive circuit, a film standing on 514 (in this example) is advanced to frame 514-1, then 514-2, 514-3 . . . etc. When the film reaches frame 515, it automatically rewinds through all of the dash number frames (here −3, −2, −1) and stops on the original frame 514. When the images are originally recorded on the film, they are numbered according to the informational content of the recorded images.

Sometimes, it is either necessary or desirable for the machine to detect the direction of film travel, independently of the outputs 384 of the comparator 336 (FIG. 11). For this, three sensors (A, B, C) are used, as shown in FIGS. 14, 15. These three sensors are geometrically arranged, as shown in FIG. 15 so that the C or third sensor 420 lies between the A and B sensors 106, 104. All three sensors are positioned to read the same bar code.

It may be recalled that the narrow bar code mark has a width of "X", the wide bar code mark has a width of "2X", and the space between the A and B sensors is 1.5 "X". Therefore, when each mark in the bar code is first read, there are the four possibilities shown in FIG. 15 by the truth table 424. More particularly, in either direction of film travel, a wide bar code mark simultaneously covers all three sensors to produce a binary word 111. However, a narrow bar code simultaneously covers only two of the sensors at a given time. Hence, if the narrow mark 422 passes under the sensors in the reverse direction, there will be a simultaneous output from the A and C sensors before there is an "0" output from the A sensor, to give the binary word 110 (as at 426). When the narrow mark travels in an opposite direction the binary word is reversed to become 011 (as at 428), before there is a "0" output from the B sensor.

From FIG. 11, it will be recalled that wire 362 is marked when the film is traveling in the forward direction. An absence of a mark on this wire indicates that film is traveling in a reverse direction. Thus, it is only necessary for the three sensors (FIG. 14) to detect and signal the forward motion and to feed the resulting signal to gate 372 and to the SL input to the shift register 356.

To connect the three sensor circuits of FIG. 14 to the control circuit of FIG. 11, it is only necessary to interconnect wires J, K and M in these two figures. Diodes 430, 432 prevent feed back between the circuit of FIG. 14 and the junction between the OR gate 388 and the MUX switch 386.

Each of the A, B, C sensors (FIG. 14) is connected to its individually associated drivers 194, 196, 436 which are, in turn, connected to individual stages in a three stage register 440. (Sensors 104, 106 and drivers 194, 196 are shown in dotted lines in FIG. 14 since they already appear in FIG. 11.) The individual stages in register 440 are set each time that the output of the associated sensor detects a mark in the bar code. By inspection of FIG. 15, it will be seen that a forward film motion is always indicated by the binary word "011", as shown at 428. Regardless of whether the narrow or the wide bar code mark passes under the sensor, such mark changes to the binary word "011" when the mark passes out from under the A sensor and is still under the B and C sensors. On the other hand, if either the wide or the narrow mark is under the sensors, the output becomes "110" when the mark passes out from under the B sensor.

The AND gate 442 conducts only when the three stages of memory 440 conduct simultaneously. This means that a bar code mark has passes under all three sensors. The gate 444 conducts when there is an output from the AND gate 442, but not from the sensor A (i.e., sensor A must turn off to remove an inhibit from input 446). A free running multivibrator 448 repeatedly resets the memory 440. The speed of this electronic reset and the mechanical transport speed are such that the output of the AND gate 442 does not have time to disappear before the output of the A sensor 104 disappears. Accordingly, gate 444 conducts only when the binary word "011" appears. If the film runs in reverse direction, the B sensor 106 ceases to conduct at a time when the A sensor 104 still has an output that inhibits the gate 444. Before the bar code mark passes out from under sensor A, the output of the free running multivibrator 448 resets the memory 440. Hence, gate 444 never conducts while the film is traveling in a reverse direction. Thus, an output on the wire M indicates a forward film motion and is effective in FIG. 11 in the same manner that a marking on wire 362 is effective.

The embodiment described above may be modified so that the microprocessor itself provides control functions over and above those previously described. In addition, the microprocessor may be programmed to effect some of the functions associated with the illustrated "hardware" so that the amount of "hardware" is reduced. For example, the embodiment shown in FIG. 22 illustrates a similar reader/printer system wherein much of the previously described "hardware" has been eliminated. In this figure, elements corresponding to previously described elements are given corresponding reference numerals.

In the embodiment of FIG. 22, a microprocessor 600 is programmed to receive inputs from various of the elements shown and to provide output signals for controlling the operation of the reader/printer. More specifically, the microprocessor 600 receives inputs from the sensors 306 and 308 via lines 602 and 604, respectively. As described before, the sensors 306 and 308 sense the bar codes on the fiche film. The microprocessor 600 receives the outputs of the sensor 306 and 308 and decodes that information to determine which fiche is passing the sensors, i.e., the present position of the film.

The keyboard 312 sends signals to the microprocessor 600 via lines 606 whenever an operator presses a key thereon to instruct the microprocessor 600 to advance the film to a desired fiche. Such signals generally constitute the address of a desired fiche.

When the microprocessor determines that the address of a desired fiche is not equal to the address of the fiche being sensed by the sensors 306 and 308, the microprocessor actuates either the forward motor 202 via its buffer 608 or the reverse motor 204 via its buffer 610, depending on whether the address of the desired fiche is greater or less than the present position of the film. Note that this arrangement difers somewhat from that shown in FIGS. 7 and 8 in that the forward, go and reverse lines have been eliminated. In the embodiment of FIG. 22, each motor receives its control signals by a single line from the microprocessor 600.

The micrprocessor 600 also receives inputs from a glass flat sensor 610 which indicates whether the glass flat is in a raised or lowered position. Such sensing may be effected by microswitches which assume a closed position in response to the glass flats being closed and an open position in response to the glass flats being open, or vice versa.

The final input to the microprocessor 600 is from a manual fiche sensor 612, not described hereinbefore.

Briefly, a manual fiche is defined herein as an individual fiche (as opposed to a roll of fiche) which may be manually inserted between the glass flats for viewing. When such a fiche is to be viewed, the microprocessor 600 advances the film to an area thereof which is transparent, i.e., which does not have an image thereon, so that the image on the manual fiche may be viewed through the transparent area of the film. Preferably, each book of the film has a transparent area so that, if the microprocessor 600 is advised that a manual fiche is to be inserted, the microprocessor 600 will advance the film to the transparent area of the book presently being sensed by the sensors 306 and 308. Transparent areas will normally also be included on the film "trailer" so that the film may be advanced to the trailer for manual fiche viewing if there are no transparent areas in the main body of the film.

The manual fiche sensor 316 may be constructed as described in U.S. Pat. No. 4,149,784, issued Apr. 17, 1979, entitled FILM READER/PRINTER WITH MANUALLY INSERTABLE DISCRETE FILM and assigned to the assignee of this invention.

Also shown in FIG. 22 is a glass flat solenoid 197 which is actuated by the microprocessor 600 via a driver 198 for opening and closing the glass flats at the appropriate times.

The way in which the microprocessor 600 is preferably programmed to exercise control over the reader/printer is shown in a general flow diagram 614 in FIG. 23. The flow diagram 614 is an overview showing various subprograms described in more detail below.

In the discussion of the program hereinafter, it is assumed that forward film motion is in the direction shown in FIG. 3. However, the positions of sensor A and B are interchanged; that is, sensor A detects a bar code before sensor B does with the film moving in a forward direction. This change is actually one of sermantics only to ensure that the program instructions conform to an assumed sensor designation and direction of film travel.

The program 614 begins, of course, with a start-up routine program A to start the microprocessor 600 reading and executing succeeding instructions. Following the program A is a read and debounce keyboard program B which first checks the condition of the glass flats. If that condition is improper, the program proceeds to a shutdown and alarm program X. Otherwise, program B determines whether a manual fiche is to be viewed; if so, a manually loaded fiche program E is entered.

Assuming that a manual fiche is not to be viewed, the microprocessor 600 scans the keyboard 312 looking for a depressed key and, finding a depressed key, goes into an intermediate program C. The latter program opens the glass flats so that the film may be advanced and determines whether a plus 1 fiche or a regularly coded fiche is to be viewed. Depending on the condition detected, either a plus 1 program F or a find fiche and register on mark program D is executed. More details of the various programs of the flow diagram 614 are described below.

Turning now to FIG. 24, portions of the flow diagram 614 are shown in more detail. In FIG. 24 and the succeeding figures, the various instructions are referenced to the programs of FIG. 23 to which they pertain by an alphabetic reference character. For example, instruction 1A refers to the first instruction or program A, instruction 1B refers to the first instruction or program B, etc.

Program A begins with the usual "Start" instruction 1A, followed by an "initialize logic" instruction 2A. Instruction 2A merely initializes all the logic within the microprocessor 600 in a conventional manner.

By instruction 3A, the microprocess is instructed to determine whether a glass flat is missing. A glass flat may be missing because it may have been removed for cleaning and not replaced. If a glass flat is determined to be missing, as by an input from the glass flat sensor 610, the microprocessor executes instruction 4A for rewinding the film, sounding an alarm, and waiting for a reset signal. The later signal may be developed by a reset button which is pushed after a missing glass flat has been replaced.

If no glass flats are missing, the microprocessor enters program B and first executes the instruction B1 for lowering the glass flat (the glass flat is normally raised when power to the reader/printer is off). With the glass flat lowered, the operator is able to view the fiche which is then positioned at the viewing station.

At this juncture, it will be noted that a point of entry into the program is provided just prior to the instruction (B1). This point of entry is denoted by B1 with an arrow leading into the program. Exits from a program are identified in an analogous manner.

Next, the microprocessor determines if the glass flats are stuck in an open position (instruction B2). If they are, instructions X1 and X2 are executed to stop the motion of the web, sound an alarm and wait for a reset signal.

If the glass flats are not stuck in an open position, the microprocessor executes instruction B3 (actually a subroutine T) for reading and debouncing the keys of the keyboard 312. During this operation, if a particular book number and chapter number are designated by the operator by depressing keys, the microprocessor reads the first key depressed and quickly executes a number of successive instructions. It then reads the second key depressed and quickly executes the same successive instructions to move the film to the address of the desired fiche. This operation will become more evident from the discussion below wherein the subroutine T is described in more detail.

After scanning the keyboard, the microprocessor executes instructions C1 and C2 for raising the glass flat (so that the film may be advanced) and for actuating a device for emitting a "beep" or audio tone. The generation of a "beep" provides audio feedback to the operator to signify that the microprocessor has scanned the keyboard and has "found" the depressed key.

Instruction C3 causes the microprocessor to determine whether the address of the desired fiche (A.D.F.) is equal to the present position (P.P.) of the film. If equality is determined, the program returns to instruction B1 so that the glass flat can be lowered, the image viewed, and the keyboard scanned again.

If the address of the desired fiche is not equal to the present position of the film, instruction C4 causes the microprocessor to determine if the Plus 1 key has been depressed and if the present position of the film is at a transparency. If the answer is "yes", the program returns to instruction B1. This effect of this operation is that the microprocessor ignores the plus 1 entry, beeps, and waits for a new entry from the keyboard. No film movement occurs.

If the answer to the last question is "no", the microprocessor is instructed to determine if the glass flat is stuck in a down position (instruction C5, FIG. 25), i.e., if the "raise glass flat" instruction C1 was properly executed. If, indeed, the glass flat is stuck in the down position, the film cannot be moved and instructions X1 and X2 are executed, as described above. If the glass flats are open as desired, the microprocessor determines if plus 1 has been entered (instruction C6). If such an entry is detected, the microprocessor exits from program C and enters the plus 1 program F, at instruction F1. Program F is described hereinafter. If plus 1 was not entered, the microprocessor enters program D for finding the desired fiche and stopping the film on the leading edge of the first bar in the bar code associated with the desired fiche.

It should be appreciated that it may be possible to enter a fiche address for which the film has no image. Alternately, the reader/printer may not be able to locate the address of the desired fiche because, for example, of smudges on the film. Should either of those contingencies occur, it is desirable to stop the search for the fiche after a predetermined interval. For this reason, instruction D1 causes the microprocessor to set an interval counter, here designated as the "missing fiche counter" to 3. After each complete search of the film, this counter is decremented by one so that after 3 unsuccessful searches, the counter will be set to zero, that condition detected, and the search discontinued.

Next, the microprocessor sets an internal direction flag to a status signifying reverse film movement (instruction D2). Instruction D2 causes the microprocessor to determine whether the address of the desired fiche is less than the present position of the film, i.e. whether the film must be moved in a reverse direction. If the answer is "no", the direction flag is set to forward (instruction D4) and the microprocessor determines whether the status of the motor coincides with the status of the direction flag (the motor status can be off, forward or reverse). If the answer to instruction D5 is "yes", the program skips directly to instruction D7.

If, in response to instruction D5, the status of the motor does not coincide with the status of the direction flat, instruction D6 powers the motor according to the status of the direction flag and decrements the missing fiche counter by one count.

After executing instruction D6 or receiving a "yes" in response to instruction D5, the microprocessor executes instruction D7 for reading the bar codes as the film moves past the sensors 306 and 308 and for updating the present position status. Thus "present position" is continuously updated as the film is advanced. Instruction D7 is described in more detail below and is, in effect, a subroutine, designated herein as subroutine U.

By instruction D8, the microprocessor determines whether the missing fiche counter is set to zero. If it is, this indicates that the address of the desired fiche has not been located, whereupon the microprocessor executes instruction D9. The latter instruction causes the microprocessor to change the address of the desired fiche to the address at which a transparency exists, either in the book being scanned, other books, or on the film trailer. The program is then returned to instruction D1 for advancing the film to the designated transparency address.

If the missing fiche counter had not been set to zero at instruction D8, the microprocessor determines at instruction D10 whether the address of the desired fiche is equal to the present position of the film. If they are not equal, the program returns to instruction D2 and repeats instructions D2–D8 until equality is achieved, that is, until the desired fiche has been found.

Upon finding the desired fiche, instruction D10A resets the missing fiche counter and instruction D11 causes the microprocessor to determine if the direction flag is set to reverse. If it is, the program goes to instruction D4, thereby moving the film in the forward direction until correspondence is again achieved between the present position and the address of the desired fiche. This ensures that the film will always be moving in a known direction (forward in this case) before the reader/printer attempts to register the A and B sensors with the desired edge of the bar code.

The registration or "homing" sequence begins with instruction D12 whereby the ramp voltage referred to above is reset to zero and the reverse motor is energized with a pulse signal having an increasing duty cycle. As the film travels in the reverse direction, instruction D13 causes the bar codes to be read by the A and B sensors and the present position of the film updated. Instruction D13 is also a subroutine and may be the same as subroutine U, described hereinafter.

Next, the microprocessor is instructed to determine whether the address of the desired fiche is less than the present position (instruction D14). If it is, the program returns to instruction D12 to continue moving the film in the reverse direction.

When the address of the desired fiche is equal to the present position, instruction D15 is executed. By this latter instruction, the microprocessor determines whether the address of the desired fiche is greater than the present position address. Because the film has been moving relatively slowly since instruction D12 was executed, the address of the desired fiche will normally be equal to, not greater than, the present position. If for some reason instruction D15 obtains a "yes" answer, the program returns to instruction D1 to search again. Usually, however, the program will proceed to instruction D16.

According to instruction D16, the ramp voltage is reset and the forward motion is "ramped" with pulses of increasing duty cycle to move the film in the forward direction slowly. As the film moves, instruction D17 causes such forward film motion to continue until sensor B develops a "high" or "true" output, signifying that the leading edge of the first bar of the desired bar code has been passed. (It should be recalled that the designation of the sensors A and B is assumed to be the reverse of that shown in FIG. 3.) When that condition occurs, instruction D18 (FIG. 26) causes the ramp voltage to be reset and the reverse motion to be "ramped".

The film moves slowly in the reverse direction until sensor B goes low (instruction D19), indicating that the registration edge has been passed again. If this edge has been passed but once in this direction during the homing sequence, instruction D20 returns the program to instruction D16. When the registration edge has been passed three times in the reverse direction, it is assumed that the film is positioned very slightly past the registration edge and that the film may be stopped.

By instruction D21, the voltage ramp is again reset and both motors are "ramped" with pulses of decreasing duty cycle, i.e., "negatively ramped". Consequently, the motors pull against each other and the film stops under decreasing tension. Thereafter, power is removed from both motors by instruction D22 and the program is returned to instruction B1 for the next complete cycle of operation.

Turning now to FIG. 27, a detailed breakdown of subroutine U (instructions D7 and D13) is shown for reading bar codes and updating the present position of the film.

This part of the program begins by detecting the condition of the flag (instruction D23). Assuming that the flag is set to forward, instruction D24 causes an internal counter and a "present position" shift register to be cleared. The counter is then incremented by one count at instruction D25.

As the A and B sensors scan successive bar codes, signals A and B are developed, similar to the signals shown in FIG. 4. Instruction D26 instructs the microprocessor to determine whether the B signal is high or low. If it is low, the microprocessor executes instructions D27 and D28. According to instructions D27 the program exits to instruction X1 for sounding an alarm and turning the motor off if more than a given amount of time has elapsed before the B signal is high. The failure to find a high B signal within that given amount of time indicates that bar codes are not being read properly, either because of a system malfunction, dirt on the film, or other problems.

Assuming that the given amount of time has not elapsed, instruction D28 causes the microprocessor to determine whether a key on the keyboard is depressed. If no key is depressed, the program returns to instruction D26 to continue looking for a high condition for signal B.

If the execution of instruction D28 indicates that a key is depressed, instruction D29 causes a determination to be made as to whether the key being depressed is the same key or a different key. If the same key is depressed, the program returns to instruction D26 to continue scanning the bar codes. However, if a new key is detected, it is presumed that the operator is correcting his previous entry, and the program continues with instructions D30 and D31 (FIG. 28) for stopping the motor. From there, the program returns to instruction B1 for processing the information from a new key.

After a high condition for signal B has been detected, instruction D32 causes the microprocessor to determine the condition of signal A (FIG. 4). If the A signal is high, a "1" is clocked into the present position shift register per instruction D33. If the A signal is detected as being low, instruction D34 causes a "0" to be clocked into the present position shift register.

To continue reading the bar code, instruction D35 looks for a high condition for signal B. If such a condition is detected, the microprocessor executes instructions D36, D37 and D38, corresponding to instructions D27, D28 and D29 described above.

If the B signal is determined to be low, the condition of the A signal is detected by instruction D39. A high condition of the A signal indicates that the last bar has not yet been read and returns the program to instruction D25, whereas a low condition indicates end of code and continues the program to instruction D40 (FIG. 28). The latter instruction causes the microprocessor to check whether the counter has been incremented to 9. If the counter has been incremented to 9, this is an indication that a complete bar code has been read because there are 9 individual bars in each bar code. In that event, the reading of a bar code and updating of present position will have been completed and the program continues to instruction D41 whereby the present position address of the film is loaded from the present position shift register.

If the counter has not been incremented to 9, the program ignores the current information stored in the present position shift register and returns to instruction D23 to read the next bar code.

Referring again to FIG. 27, it will be recalled that the microprocessor proceeded from instruction D23 to D24 only if the forward flag had been set. If it had not been set, this condition indicates that the film is moving such that the code will be read in reverse. Accordingly, instructions D24' and D39' are executed, each of which corresponds to instructions D-24-D39, respectively, except that the designations "A" and "B" are interchanged and the shift register is clocked in the opposite direction.

Upon the completion of instruction D39', the microprocessor proceeds to instruction D41 and to the end of the subroutine.

Turning now to a discussion of the plus one program, a more detailed flow diagram thereof is illustrated in FIG. 29. For the terminology and sequence of instructions used hereinafter with the plus one program, it is assumed that the film has properly come to rest from a previous search as indicated in FIG. 30.

The plus one program begins by resetting the ramp voltage and ramping the forward motor (instruction F1). With the film moving slowly in the forward direction, the microprocessor begins looking for the wide plus one bar by first executing instructions F2, F3 and F4 in order to assure that the bar code at the present position has passed. After the execution of instruction F4, the status of sensor B will be low. Thereafter, instruction F4A causes the program to loop as indicated until sensor B goes high. Thereafter, instruction F5 looks at the condition of the A signal. If the latter is low, this condition indicates that a new bar code has been found rather than a plus one mark. Accordingly, the program exits to instruction D1 for placing the original fiche back in the viewing station. If the A signal is high when instruction F5 is executed, instructions F6 and F7 are executed to look for another condition indicative of a new bar code rather than a plus one mark. If the A signal is high after executing instructions F6 and F7, this indicates that a new bar code has been encountered, whereupon the program exits to instruction D1. However, if the A signal is determined to be low upon the execution of instructions F6 and F7, a plus one mark will have been found.

Having found the plus one mark, the program then continues with instruction D10 and subsequent instructions for registering on the leading edge of the plus one mark.

The read and debounce keys program (subroutine T) is shown in more detail in FIG. 32. This program starts with instruction B4 by which a determination is made as to whether a manually inserted fiche is covering one or both of the manual fiche sensors. These sensors are situated near the location on the reader/printer where access is provided for the manual insertion of a single fiche. FIG. 31 indicates a first manual fiche sensor 616 and a second manual fiche sensor 618, both of which are preferably optical sensors. As shown, a manual fiche carrier 620 is covering only the second manual fiche sensor 618, which is the condition existing when the carrier 620 is fully inserted for viewing the fiche which it carries. If the execution of instruction B4 indicates that neither of the sensors 616, 618 is covered, the reader/printer is thereby instructed that manual fiche operation is not intended, wherefore the program continues to instruction B5.

According to instruction B5, an internal "debounce counter" is set to a predetermined number, 80 for example, indicative of the number of times a keyboard key is to be sampled. If a predetermined number of consecutively identical samples of a key condition are detected, it is assumed that the sample thus obtained is a legitimate sample.

Before continuing with the explanation of the program, it should be understood that the keyboard will usually include an orthgonal array of rows and columns of switches. Each switch is located at the intersection of a particular row and column so that its status can be determined by sampling the status of the row and column in which the switch is located.

Furthermore, each switch is actuated by a keyboard key upon which graphics are imprinted to indicate to an operator which book or chapter may be located by depression of that key. The keys, however, are not connected so as to directly access any particular fiche. Rather, the depression of a key causes the microprocessor to read a particular portion of a "look-up" table, the latter of which includes the addresses of all fiche. Once the address is located, the reader/printer advances the film to the desired fiche. Thus, the graphics on a key can be changed to access a different fiche, yet the "hard" wiring need not be changed. Only the look-up table need to altered or reflect the changes in the graphics.

Returning now to the program, instruction B6 causes the microprocessor to select the first column of the switch array for sampling and to reset a look-up table counter to a constant number. Such column selection is preferably effected by placing a logic one on the column being sampled. Thus, if any switch is closed in the selected column, that same logic one will be present on the row which intersects the sampled column. The particular switch which is located at the intersection of the selected column and the row having the logic one will have thus been identified.

Following instruction B6, the microprocessor sets a row counter to 7, in this example, (instruction B7) and then reads all rows as a multi-bit word from the keyboard (instruction B8). By instruction B8, the microprocessor samples all 8 rows of switches as a block (8 bits).

The next instruction, B9, causes the microprocessor to determine whether all 8 bits are zero (no key depressed in that column). Assuming for the moment that at least one key is depressed, the microprocessor executes instructions B10 and B11 to determine which row is a logic one, i.e., which key in the sampled column is depressed.

Specifically, instruction B10 inquires as to whether the bit from row 8 is a logic one. If it is not a logic one, the microprocessor executes instruction B11 whereby the 8 bits, serially arranged, are shifted left by one position. For example, assuming that bit 5 is a logic one, that bit would be shifted to bit position 6 and all of the other seven bit positions would be at logic zero. Instruction B11 also decrements the row counter which was previously set to 7. Thereafter, instructions B10 and B11 are executed repeatedly until the logic one bit which was originally in bit position 5 is shifted to bit position 8. During this operation, the row counter is decremented once for each shift in bit positions so that, at the end of this sequence, the numerical value in the row counter is equal to the number of the row in which the logic one was originally detected.

Instruction B12 causes the microprocessor to add the value presently in the row counter to the value in the look-up table counter, the result of which is that the row number of the key which was identified as being depressed is put into the look-up table counter.

Next, instruction B13 causes an "exit key" register to be loaded with the value in the look-up table counter, i.e., a number corresponding to the keyboard location of the key which was depressed. By instruction B14, the microprocessor determines whether the value in the exit key register is equal to the value in a "last key" register.

Assuming that the microprocessor is making a first pass through instruction B14, the value of the exit key register will not be equal to the value of the last key register. Consequently, the microprocessor will proceed to instruction B15. At this point, the value in the exit key register is loaded into the last key register, the program returns to instruction B5, and the microprocessor makes another pass through instructions B5-B14. On the second pass, the program will proceed from instruction B14 to instruction B16 to decrement the debounce counter to 79. This sequence continues until either the exit key register and the last key register are not equal, or the debounce counter equals zero.

By instruction B17, a determination is made as to whether 80 identical keyboard samples have been taken. Assuming the 80 samples have not been taken, the program returns to instruction B6 to continue sampling the switches.

After 80 samples of the switches have been taken, the program exits instruction B17 to B18, whereupon the address of the desired fiche is loaded into a "new fiche" register from the look-up table. Thereafter, the program reverts to instruction C1 (FIG. 24) to locate the desired fiche.

Returning to instruction B9, it will be recalled that the assumption was made that a depressed key was located in column 1, wherefore the program proceeded to instruction B10. However, if no key in column 1 was depressed, the program continues from instruction B9 to B19, at which point a value of 8 is added to the look-up table counter. The effect of this instruction is that the look-up table counter is now programmed to bypass the first 8 locations in the look-up table because those first 8 locations correspond to fiche addresses available only by way of the keys in the first column, none of which were depressed.

Following instruction B19, a determination is made (instruction B20) as to whether the end of the look-up table has been arrived at (an 8 by 8 array of switches requires a look-up table having 64 addresses). If the value in the look-up table counter exceeds 64, this is an indication that no keys were depressed. Under that condition, the program returns to instruction B4 to continue looking for a depressed key.

If all columns have not been sampled, the program proceeds to instruction B21 for incrementing a column select, that is, for selecting (sampling) the next adjacent column. Now the program returns to instruction B7 and executes the instructions previously described for determining which key, if any, has been depressed in column 2. The remaining columns 3-8 are sampled in the same manner.

In the discussion above, the assumption was made that neither of the manual fiche sensors 616, 618 were covered (see instruction B4). If, however, one of those sensors had been covered, the program would have continued to the manually loaded fiche program, starting with instruction E1 (FIG. 32.)

By instruction E1, the microprocessor determines whether the present position of the film is "equal to" a manual fiche location, that is, whether a transparent portion of the film is positioned at the viewing station; if not, the program proceeds to instruction B5, thereby ignoring the status of the manual fiche sensors. If, after going through the program, the film is advanced so that a transparency is positioned at the viewing station, the microprocessor executes instruction E2 to determine if the first manual fiche sensor 616 is covered. If it is, the glass flats are opened (instruction E3) and the program loops through instructions E1-E3 until the manual fiche carrier 620 is properly positioned. When this occurs, the program proceeds from instruction E2 to instruction B1 for closing the glass flats so that the manual fiche can be viewed.

It will be appreciated that the flow chart 614 sets forth in a logical but functional manner an exemplary program for controlling the reader/printer. The actual machine instructions will depend on the type of microprocessor used, but those instructions will be apparent to one skilled in the art in light of the disclosure. Of course, the invention is not intended to be limited by any particular flow chart or machine instructions. Further, it will be obvious to one skilled in the art that many modifications and alterations to the illustrated structure may also be made without departing from the spirit and scope of the invention. Accordingly, it is intended that all such modifications and alterations be included within the scope of the invention as defined by the appended claims.

We claim:

1. A microfilm reader/printer having a viewing area for use with a web having thereon photographic areas which are individually identified by elongated codes including a series of marks with the elongated dimension of said series of marks being aligned and positioned along the edge of said web, and extending over a portion of the length of said web, each of said codes being positioned adjacent individually associated ones of said areas, means for transporting said web over a path through said reader/printer in either of two opposing directions which presents said marks in series to any point along the path of web travel, at least a pair of sensor means located adjacent said path for individually reading each of said codes in series as said web is being transported adjacent said sensor means, said sensor means reading said code responsive to transport of said web in either of said two directions with one of said sensors strobing the other of said sensors, means responsive to code reading by one sensor means under the control of the other sensor means for storing a code identifying a photographic area on said web, means for indicating a selected code, comparator means jointly responsive to the codes read by said sensor means and said code-indicating means for comparing the sensed and indicated codes, and means for reversing the direction of web transport responsive to said comparing means detecting a change in the relationship between said compared codes which indicates that the desired photographic area has passed the viewing area, the strobing function performed by at least one of said sensor means reversing each time that the direction of web travel reverses.

2. The reader/printer of claim 1 wherein there is a first motor for reeling said web in one of said two directions and a second motor for reeling said web in the opposite of said two directions, and means responsive to said comparator means finding equality between said compared codes for connecting said sensor means directly to one of said motors and through an inverter means to the other of said motors whereby the reeling of said web repeatedly reverses said directions until a mark sensed by said sensor means comes to rest directly under said sensor means.

3. The reader/printer of claim 2 and means whereby the deceleration is greater than the acceleration each time that said web transport means reverses direction so that said film comes to rest without braking.

4. The reader/printer of claim 1 wherein each of said codes comprises a predetermined number of marks, means for generating parity envelope representing the beginning and the end of said predetermined number of marks, and means for rejecting said code if said predetermined number of marks are not read during said parity envelope.

5. The reader/printer of claim 1 wherein said means for indicating a code of a selected photographic area comprises means for separately indicating two codes.

6. The reader/printer of claim 5 wherein one of said two codes identifies a book and the second of said two codes identifies a chapter.

7. The reader/printer of claim 6 and means for manually selecting a page in said chapter.

8. The reader/printer of claim 1 wherein said means for indicating a selected code includes a mechanical keyboard, whereby operation of a key may cause a contact bounce, means responsive to operation of a key for measuring a period of time which exceeds the contact bounce period, and means responsive to said measuring means for transferring an indicated code signal from said keyboard to said comparing means after the end of said measured period of time.

9. The reader/printer of claim 1 and time control means for cyclically reading said comparator means and said sensing means, whereby said comparator means is continuously updated as to the instantaneous code being read by said sensor means.

10. The reader/printer of claim 9 and means responsive to said comparator means finding an approximate equality between said compared codes for interrupting said cyclic reading and initiating a transport homing sequence.

11. A reader/printer as set forth in claim 1 wherein each of said codes on the web comprises a series of marks, each mark being representative of a logic one or zero.

12. A reader/printer as set forth in claim 11 wherein each mark which is representative of a logic zero has a predetermined width, wherein each mark which is representative of a logic one has a width equal to twice said predetermined width and wherein adjacent marks are separated by a distance equal to said predetermined width.

13. A reader/printer as set forth in claim 12 wherein said sensor means are spaced apart from each other by a distance equal to 1.5 times said predetermined width.

14. A reader/printer as set forth in claim 1 wherein the web includes at least one transparent area thereon, and including means for receiving a manually inserted fiche for viewing thereof, means for sensing the insertion of a fiche, and means responsive to said sensing means for actuating said transporting means so as to advance said transparent area to the viewing area, whereby the manually inserted fiche may be viewed without removing the web from the reader/printer.

15. A reader/printer as set forth in claim 1 wherein the web includes at least one transparent area, and means responsive to said sensor means failing to read a selected code for causing said transporting means to advance said transparent area to the viewing area, thereby indicating to an operator that the photographic area identified by the selected code cannot be located.

16. A reader/printer as set forth in claim 1 wherein said indicating means includes a keyboard having operator-actuatable keys imprinted with graphics indicative of information contained in the photographic areas of the web, wherein said storing means stores addresses of photographic areas of the web, and including means for reading said addresses in response to operator actuation of said keys for determining the position on the web of a selected photographic area.

17. A microfilm reader/printer having a viewing area for use with a web having thereon photographic areas which are individually identified by codes, each of said codes being a series of similar marks formed against a contrasting background extending along the length of the web, the length of said web being parallel to the series of marks and adjacent individually associated ones of said areas, means for transporting said web over a path through said reader/printer in either of two opposing directions which presents said marks in series to any point along the path of web travel, a pair of sensor means located adjacent said path for individually reading each mark of said codes, each of said sensor means individually reading each mark in said series as it appears whereby said marks are read in one order when said web transport is driving in one direction and in an inverse order when said web transport is driving in the opposite direction, means responsive to code reading by one sensor means under the control of the other sensor means for identifying a photographic area on said web, shift register storage means for storing signals representing each of said marks, means responsive to said sensor means for storing data in said shift register with shifting in a first direction when said web transport moves in said one direction and with shifting in an opposite direction when said web transport moves in said opposite direction whereby the same code stores the same data in said shift register regardless of the direction of web travel, means for indicating a selected code, comparator means jointly responsive to the codes read by said sensor means and said code-indicating means for comparing the sensed and indicated codes, and means for reversing the direction of web transport responsive to said comparing means detecting a change in the relationship between said compared codes which indicates that the desired photographic area has passed the viewing area, a function performed responsive to at least one of said sensor means reversing each time that the direction of web travel reverses.

18. The reader/printer of claim 17 and means responsive to said comparator means for controlling the direction in which said data is shifted in said shift register.

19. The reader/printer of claim 17 and means responsive to said sensor means for detecting the direction of web travel and controlling the direction in which said data is shifted into said shift register.

20. The reader/printer of claim 19 wherein said sensor means comprises three sensors, all activated in sequence responsive to each mark in said series of marks.

21. A microfilm reader/printer having a viewing area for use with a web having thereon photographic areas which are individually identified by codes printed along the length of said web and adjacent individually associated ones of said areas, means for transporting said web through said reader/printer in either of two opposing directions, sensing means for reading each of said codes as said web is being transported in either of said two opposing directions adjacent said sensing means, means for indicating a code identifying a selected photographic area on said web, comparator means jointly responsive to said sensing means and said indicating means for comparing the sensed and indicated codes, means for reversing the direction of web transport responsive to said comparing means detecting a change in the relationship between said compared codes which indicates that the photographic area has passed the viewing area, said printed code being a series of marks extending along the length of the web, the length of said web being parallel to the series of marks, said sensor means individually reading each mark in said series as it appears, whereby said marks are read in one order when said web transport is driving in one direction and in an inverse order when said web transport is driving in the opposite direction, storage means responsive to said sensing means, said storage means comprising shift register storage means for storing signals representing each of said marks, means responsive to said sensor means for storing data in said shift register with shifting in a first direction when said web transport moves in said one direction and with shifting in an opposite direction when said web transport moves in said opposite direction, whereby the same code stores the same data in said shift register regardless of the direction of web travel, said series of marks in said printed code comprising a binary word series of discrete marks extending along predetermined lengths of said web, said sensing means comprising two sensor means located a predetermined distance from each other to scan the same series of marks, each of said sensor means being positioned to generate a pulse having leading and trailing edges responsive to each of said discrete marks, means responsive to the leading edge of each of said pulses from one of said sensors for gating the output of the other of said sensors into said shift register when said web transport moves in a first direction, and means responsive to the trailing edge of each of said pulses from said one sensor for gating the output of the other of said sensors into said shift register when said web transport moves in the second of said directions, whereby the same data is shifted into said shift register regardless of the direction of web travel.

22. The reader/printer of claim 21 and code validation means operated responsive to the trailing edge of each of said pulses from said one sensor when said transport moves said web in said first direction and to the leading edge of each of said pulses from said one sensor when said tranport moves said web in said second direction, and means responsive to said code validation means for clearing said shift register when an invalid code is detected.

23. The reader/printer of claim 22 wherein said code validation means operates responsive to a failure of said one sensor to generate succeeding pulses within a predetermined period of time.

24. A microfilm reader/printer having a viewing area for use with a web having thereon photographic areas which are individually identified by codes including a series of marks positioned along the length of said web and adjacent individually associated ones of said areas, means for transporting said web over a path through said reader/printer in either of two opposing directions which presents said marks in series to any point along the path of web travel, first motor means for reeling said web in one of said two directions and second motor means for reeling said web in the opposite of said two directions, a pair of sensor means located adjacent said path for individually reading each of said codes in series as said web is being transported adjacent said sensor means, said sensor means sensing said code responsive to transport of said web in either of said two directions, means responsive to code reading by one sensor means under the control of the other sensor means for storing a code identifying a photographic area on said web, means for indicating a selected code, comparator means jointly responsive to the codes read by said sensor means and said storing means for comparing the sensed and indicated codes, means responsive to said comparator means finding equality between said compared codes for connecting said sensor means directly to one of said motors and through an inverter means to the other of said motors whereby the reeling of said web repeatedly reverses said directions until a mark sensed by said sensor means comes to rest directly under said sensor means, said last-named means reversing the direction of web transport responsive to said comparing means detecting a change in the relationship between said compared codes which indicates that the desired photographic area has passed the viewing area, a function performed by at least one of said sensor means reversing each time that the direction of web travel reverses, means responsive to said comparator means detecting approximate equality between said sensed and indicated codes for initiating a sequence for homing said web at a desired position, means for carrying out said homing sequence by repeatedly and cyclically interrupting the energy supplied to said motors, and means for progressively changing the duty cycle of said energy interrupting means so that a progressively greater level of energy is applied to said motors each time that the web reverses direction, whereby said motors start slowly when the level of said progressively increasing energy reaches a level which overcomes friction in said transport means.

25. The reader/printer of claim 24 and means responsive to said homing sequence for simultaneously energizing both of said motors, and means for progressively reducing the level of energy applied to said two motors for maintaining web tension without moving said web.

26. A microfilm reader/printer having a viewing area for use with a web having thereon photographic areas which are individually identified by codes including a series of marks positioned along the length of said web and adjacent individually associated ones of said areas, means for transporting said web over a path through said reader/printer in either of two opposing directions which presents said marks in series to any point along the path of web travel, a pair of sensor means located adjacent said path for individually reading each of said codes in series as said web is being transported adjacent said sensor means, sensor means sensing said code responsive to transport of said web in either of said two directions, means responsive to code reading by one sensor means under the control of the other sensor means for storing a code identifying a photographic area on said web, means for indicating a selected code, comparator means jointly responsive to the codes read by said sensor means and said code-indicating means for comparing the sensed and indicated codes, means for reversing the direction of web transport responsive to said comparing means detecting a change in the relationship between said compared codes which indicates that the desired photographic area has passed the viewing area, a function performed by at least one of said sensor means reversing each time that the direction of web travel reverses, means responsive to a demand for a predetermined one of said codes for advancing said web by a distance equal to one photographic area in search for a distinctive code printed on said web, means responsive to said distinctive code for homing said web with said one photographic area in said viewing area and means responsive to detection of any except said distinctive code for returning to the last preceding code.

27. A microfilm reader/printer having a viewing area for use with a web having thereon photographic areas which are individually identified by codes including a series of marks positioned along the length of said web and adjacent individually associated ones of said areas, means for transporting said web over a path through said reader/printer in either of two opposing directions which presents said marks in series to any point along the path of web travel, a pair of sensor means located adjacent said path for individually reading each of said codes in series as said web is being transported adjacent said sensor means, sensor means sensing said code responsive to transport of said web in either of said two directions, means responsive to code reading by one sensor means under the control of the other sensor means for storing a code identifying a desired photographic area on said web, a keyboard means having a plurality of keys which are individually marked with said codes for indicating a selected code, comparator means jointly responsive to the codes read by said sensor means and said keyboard means for comparing the sensed and indicated codes, means for reversing the direction of web transport responsive to said comparing means detecting a change in the relationship between said compared codes which indicates that the desired photographic area has passed the viewing area, a function performed by at least one of said sensor means reversing each time that the direction of web travel reverses, one of said keys being marked with a plus one symbol to indicate that said transport should advance by one photographic area, means responsive to operation of said plus one key for advancing said web until the next code comes under said sensing means, and means responsive to said next code for either stopping said transport or for rewinding to a preceding web area, depening upon the nature of the code.

28. A process for using a microprocessor to control a reader/printer having a viewing area for use with strips of film, each strip of film having thereon a plurality of photographic areas, each photographic area being individually identified by an elongated series of code marks sequentially formed, the elongated dimension of said series extending along and parallel with the length of said film, said process comprising the steps of:

(a) transporting said strips of film in either of two directions through said reader/printer, (b) sensing in series each mark of said codes on said film at each of two separated positions as said film is being transported in either of two directions through said reader/printer, the sensing at one of said two positions strobing the sensing at the other of said two positions, said sensed series of marks being inverted when said film is transported in one of said two directions, (c) indicating a selected code for identifying a selected one of said photographic areas on said film, (d) comparing the sensed and indicated codes to determine the direction which said film should be transported through said reader/printer in order to reach said selected one of said photographic areas, (e) reversing the direction of film transport responsive to said comparison indicating that a change of transport direction is necessary to bring the selected photographic area into the viewing area, and (f) reversing the strobing function in at least one of said two sensing positions responsive to each transport reversal.

29. The process of claim 28 and the added step of driving the transport for said film in either a forward or a reverse direction responsive to the sensing of said code.

30. The process of claim 28 wherein said film transport has two motors for individually reeling said film in opposite directions, and the added steps of:

(g) detecting an approximate equality between said sensed and indicated codes for initiating a stop sequence which repeatedly reverses the film transport, (h) carrying out said stop sequence by repeatedly and cyclically interrupting energy to said motors after each reversal, and (i) progressively changing the duty cycle of said energy interruptions after each reversal so that a progressively greater level of energy is applied to said motors, whereby said motors start slowly after each reversal when said progressively increasing energy reaches a level which overcomes friction in said film transport.

31. The process of claim 30 and the added steps of:

(j) energizing both of said motors with a progressively lesser level of energy whereby said two motors maintain film tension without moving said film.

32. The process of claim 28 and the added steps of:

(g) generating a pair of time displaced pulses responsive to each of said code of marks, whereby there are two identical pulse trains, one lagging after the other, and (h) clocking the pulses in one of said two pulse trains responsive to the corresponding pulses in the other of said two pulse trains.

33. The process of claim 32 and the added step of reversing the role of said two pulse trains responsive to the reversing of said film transport.

34. The process of claim 28 and the added steps of:

(g) indicating the code in step (c) responsive to a keyboard operation subject to a contact bounce, (h) measuring a period of time which exceeds the period during which said contact may bounce, and (i) transferring a code signal from said keyboard for comparing in step (d) after the end of said measured period of time.

35. The process of claim 28 and the added step of:

(g) cyclically repeating said steps (b) and (d) whereby said comparison is continuously updated to reflect the instantaneous code reading.

36. The process of claim 35 and the added steps of:

(h) finding an approximate equality between said compared codes during repeated steps (d) for interrupting said cyclic reading, and (i) initiating a transport stopping sequence.

37. The process of claim 28 wherein there is a first motor for reeling film in one direction and a second motor for reeling said film in an opposite direction, said process including the added steps of:

(g) finding equality between said compared codes during step (d), (h) connecting one of said motors directly to be controlled by the sensing of step (b), and (i) connecting said one motor indirectly to be controlled in an inverse sense by the sensing of step (b) whereby said film repeatedly reverses direction until a mark sensed during said sensing step (b) comes to rest directly under a desired point of reference.

38. The process of claim 28 wherein step (c) comprises the further steps of:

(c-1) registering a first address in terms of a book title to identify a book of information data, (c-2) registering a second address in terms of a chapter title to identify a chaper of information data included within said identified book, (c-3) automatically transporting said web to find the book and chapter of information data addressed during steps (c-1) and (c-2), and (c-4) manually finding a page in the chapter found during step (c-3).

39. The process of claim 38 and the added steps of:

(g) reading bar code addresses formed on said web in terms of a standard address code geometry while said transport moves said web, (h) comparing the address read during step (g) with a standard geometry of an address code, and (i) accepting or rejecting the address read during step (g) responsive to the comparison of step (h).

40. A process for using a microprocessor to control a reader/printer having a viewing area for use with strips of film, each strip of film having thereon a plurality of photographic areas, each photographic area being individually identified by a series of code marks sequentially formed along the length of said film each of said series of code marks being a similar mark on a uniform background to form a binary word, said process comprising the steps of:

(a) transporting said strips of film in either of two directions through said reader/printer, (b) sensing in series each mark of said codes on said film as it is being transported in either of two directions through said reader/printer, said sensed series of marks being inverted when said film is transported in one of said two directions, (c) the sensing of step (b) comprising a reading of each mark in said series as it appears before sensing means stationed along a path over which said film is transported, whereby said marks are read in the binary word order when said film transport is driving in one of said two directions and in an inverse order when said film transport is driving in the other of said two directions, (d) indicating a selected code for identifying a desired one of said photographic areas on said film, (e) comparing the sensed and indicated codes to determine the direction which said film should be transported through said reader/printer in order to reach said desired one of said photographic areas, (f) reversing the direction of film transport responsive to said comparison indicating that a change of transport direction is necessary to bring the desired photographic area into the viewing area, and (g) storing data read in the binary word order by insertion into one side of a memory when said film transport drives in said one direction and storing data read in said inverse order by insertion into the other side of said memory when said film transport moves in an opposite direction, whereby the same data always appears in the same order in said memory regardless of the direction of film travel.

41. A process for using a microprocessor to control a reader/printer having a viewing area for use with strips of film, each strip of film having thereon a plurality of photographic areas, each photographic area being individually identified by code marks printed along the length of said film, said process comprising the steps of:

(a) transporting said strips of film in either of two directions through said reader/printer, (b) sensing each of said codes on said film at each of two sensors as said film is being transported in either of said two directions through said reader/printer, (c) indicating a selected code for identifying a selected one of said photographic areas on said film, (d) comparing the sensed and indicated codes to determine the direction which said film should be transported through said reader/printer in order to reach said selected one of said photographic areas, (e) reversing the direction of film transport responsive to said comparison indicating that a change of transport direction is necessary to bring the selected photographic area into the viewing area, (f) generating a pulse having leading and trailing edges responsive to each of said series of marks passing each of said two sensors, (g) gating the output of one of said sensors into memory storage responsive to the leading edge of each of said pulses from the other of said sensors when said film transport moves in one direction, and (h) gating the output of said one sensor into memory storage responsive to the trailing edge of each of said pulses from said other sensor when said film transport moves in the other of said directions.

42. The process of claim 41 and the added steps of:

(i) validating each of said pulses from said one sensor responsive to the trailing edge of each of said pulses from the other of said sensors when said transport moves in said one direction and to the leading edge of each of said pulses from said other of said sensors when said transport moves in said other direction, and (j) clearing said shift register when an invalid code is detected.

43. In a web transport mechanism comprising two motors for individually driving first or second reels having the web extending therebetween, thereby transporting the web in either forward or reverse directions depending upon which of said motors is energized, the process comprising the steps of:

(a) driving one of said motors at a high energy level in order to transport said web in one direction, (b) energizing the other of said motors at a low energy level in order to maintain web tension, (c) modulating by interruption the energy applied to either of said motors at a rate which controls said energy levels, and (d) said interrupted energy being applied to said one motor beginning with a low energy on/off duty cycle of interruptions, which progressively changes to raise said energy level being applied to said motor, whereby said transport mechanism begins to operate and move said web when said energy level exactly overcomes the instantaneous friction of said transport mechanism.

44. The process of claim 43 wherein step 1 includes the added steps of:

(b-1) said interrupted energy being applied simultaneously to each of said motors with an on/off duty cycle, and (b-2) progressively changing said duty cycle to progressively lower said energy level whereby said transport mechanism stops when said energy level drops below a threshold, with both of said motors being energized to maintain web tension.

45. A process for positioning a bi-directional web transport mechanism, with the web homing on an edge of one of many encoded information-containing marks formed on said web, said process comprising the steps of:

(a) reading the encoding of said marks on said web as said web is transported in one of said directions, (b) detecting a selected one of said encoded marks according to the information contained therein, (c) reversing the direction of said web transport mechanism a predetermined multiplicity of times responsive to said detection of said selected mark according to the information contained therein, (d) thereafter reversing said web transport said predetermined multiplicity of times responsive to each in said multiplicity of changes in said reading means, indicating that the information contained in said selected mark has been read and re-read, (e) decelerating said web at a relatively high rate responsive to each reversal of said transport mechanism, and (f) accelerating said web at a relatively low rate responsive to each reversal of said transport mechanism.

46. The process of transporting a web in machines having frictional forces subject to instantaneous variations and to variations from machine to machine, said process comprising the steps of:

(a) applying energy to said transport mechanism, (b) interrupting said applied energy to establish an on/off pulse pattern with a variable duty cycle wherein said pulse pattern changes in order to make a period for energizing said machine longer or shorter for varying the total amount of energy applied to said mechanism, said interruptions initially applying repeated narrow pulses of energy to said mechanism, and (c) gradually changing said duty cycle to gradually lengthen the energizing period of said pulses and increase the widths of the pulses and therefore the amount of applied energy, whereby said mechanism starts when said increasing energy overcomes said instantaneous friction.

47. The process of claim 46 and the added step of gradually changing the duty cycle to gradually decrease the amount of applied energy, whereby said mechanism stops when said decreasing energy is overcome by said instantaneous friction.

48. A process for reading a multi-symbol bar code comprising a series of marks separated by spaces wherein each of said spaces has a uniform width and each of said marks has a width equal to either the width of a space or two times the width of a space, each combination of one of said marks and one of said spaces being a coded information signal, said bar code being free of special start of code or end of code signals for defining a complete bar code, said bar code being on a web transported through a machine, said process comprising:
- (a) reading each coded information signal of a bar code, as said web is transported through said machine,
- (b) reading the geometry of said bar code and generating an envelope signal responsive to said geometry, and
- (c) comparing the coded information signal read in step (a) with the envelope geometry signal generated in step (b) to verify the apparent validity of said bar code.

49. The process of claim 48 and the added steps of:
- (d) storing each of said symbols as it is read,
- (e) cancelling said storage of said symbols responsive to the geometry symbol, and
- (f) responding to a full complement of said stored symbols, whereby there is no response to said stored symbols if said symbols are cancelled in step (e) before a full complement of symbols are stored.

50. The process of claim 48 and wherein some of said symbols are distinctive bar codes, and the added step of selectively advancing said web bar code by bar code as long as one of said distinctive bar codes is detected and rewinding said web to the last non-distinctive bar code responsive to said web advancing to a non-distinctive bar code.

51. A process of controlling a web transport comprising the steps of:
- (a) registering a first address in terms of a book title to identify a book of information data,
- (b) registering a second address in terms of a chapter title to identify a chapter of information data included within said identified book,
- (c) automatically transporting said web to find the book and chapter of information data addressed during steps (a) and (b),
- (d) manually finding a page in the chapter found during step (c),
- (e) recording said information data on discrete areas of said web according to the addresses identified in terms of book and chapter,
- (f) recording special addresses indicating that overflow information appears on discrete areas following the area identified by the address of the chapter containing said overflow information,
- (g) identifying successive overflow areas by said special overflow address which is repeated at each overflow area for individually identifying every overflow area,
- (h) advancing said web transport area by area responsive to a reading of said overflow addresses, and
- (i) returning said transport to the area identified by the address of the chapter containing the overflow information data responsive to said web transport encountering a code other than said special overflow address.

52. A reader for bar codes comprising a series of marks separated by spaces wherein each of said spaces has a uniform width and each of said marks has a width equal to either the width of a space or two times the width of a space, at least three sensor means, means for logically interpreting the output of said three sensor means in order to detect the direction of movement relative to said bar code responsive to a reading of each mark and each space as it is encountered during said movement, means responsive to at least one of said sensor means reading said bar code for giving signals relating to the characteristics of said movement, and means jointly responsive to the reading of said one sensor means and to at least another of said sensor means reading said bar code for indicating the information stored in said bar code.

53. The reader of claim 52 wherein two of said sensor means give signals responsive to said movement, a first of said two sensors means indicating the speed of said movement and the second of said two sensor means cooperating with said first sensor means to indicate the direction of said movement.

54. A device for responding to information conveyed by selectively encoded combinations of marks and spaces which may be transported past a sensor means in different travel modes whereby said sensor means receive signals responsive to the same marks and spaces, which signals are variegated by said differences in travel mode, said sensor means including more than two reading heads, means responsive to a first reading head for detecting said marks and spaces and for generating first electrical signals responsive thereto, means responsive to a second of said reading heads for detecting a first instantaneous characteristic of said travel mode and generating a second electrical signal responsive thereto, means responsive to a third of said reading heads for detecting a second instantaneous characteristic of said travel mode and generating a third electrical signal responsive thereto, and means for extracting said information from said first electrical signals responsive to a utilization of said second and third electrical signals.

55. The device of claim 54 wherein all of said spaces have a uniform width and each of said marks has a width equal to either one or two of said uniform widths.

56. The device of claim 55 wherein said first characteristic is the relative speed at which said first reading head encounters said marks and spaces.

57. The device of claim 56 wherein said second characteristic is the direction in which said marks and spaces and said reading heads pass each other.

58. The device of claim 57 wherein said marks and spaces are bar codes on microfilm, and said travel modes are determined by a transport for moving said film past said sensor means.

59. A microfilm reader/printer for imaging photographic areas of a microfilm web on a viewing area, comprising:
- means for transporting the web in forward and reverse directions;
- at least two optical sensor means for reading, as the web is transported, codes which are disposed adjacent the photographic areas and for generating output signals representative of a binary address of the photographic area adjacent a read code;

a keyboard for manually entering information corresponding to an address of a particular photographic area selected for viewing;

a microprocessor-based controller adapted to receive the addresses generated by said sensing means as the web is transported and for ascertaining from the received addresses the position of the web, adapted to receive said manually entered information for comparison of web position with the address of said selected photographic area, adapted to cause said transporting means to advance the web for a predetermined interval toward the viewing area until the position of the web substantially corresponds to the address of said selected photographic area, and to terminate web transport subsequent to said predetermined interval if no correspondence occurs between web position and the address of said selected photographic area.

60. A reader/printer as set forth in claim 59 wherein the web includes at least one transparent area thereon, and including means for receiving a manually inserted fiche for viewing thereof, means for sensing the insertion of a fiche, and wherein said controller is responsive to said sensing means for actuating said transporting means so as to advance said transparent area of the web to the viewing area, whereby the manually inserted fiche may be viewed without removing the web from the reader/printer.

61. A reader/printer as set forth in claim 59 wherein the web includes a transparent area, and wherein said controller is responsive to said sensor means failing to read the coded address of said selected photographic area for causing said transporting means to advance said transparent area to the viewing area.

62. A reader/printer as set forth in claim 59 wherein said keyboard has operator-actuable keys imprinted with graphics indicative of information contained in the photograhic areas of the web, and wherein said controller is adapted to store addresses of photographic areas of the web and to read said addresses in response to operator actuation of said keys for determining the position on the web of a selected photographic area.

* * * * *